(12) United States Patent
Abdelraheem et al.

(10) Patent No.: US 12,184,625 B2
(45) Date of Patent: *Dec. 31, 2024

(54) PRIVATE SEARCH SERVICE

(71) Applicant: INTELLIGENT VOICE LIMITED, London (GB)

(72) Inventors: Mohamed Ahmed Abdelraheem, London (GB); Cornelius Patrick Glackin, London (GB); Nigel Cannings, London (GB)

(73) Assignee: INTELLIGENT VOICE LIMITED, London (GB)

( * ) Notice: Subject to any disclaimer, the term of this patent is extended or adjusted under 35 U.S.C. 154(b) by 205 days.

This patent is subject to a terminal disclaimer.

(21) Appl. No.: 17/819,166

(22) Filed: Aug. 11, 2022

(65) Prior Publication Data
US 2024/0056427 A1    Feb. 15, 2024

(51) Int. Cl.
*H04L 9/40*    (2022.01)

(52) U.S. Cl.
CPC ................. *H04L 63/0435* (2013.01)

(58) Field of Classification Search
None
See application file for complete search history.

(56) References Cited

U.S. PATENT DOCUMENTS

| | | | | |
|---|---|---|---|---|
| 9,355,271 B2* | 5/2016 | Yavuz | ................. | G06F 21/6227 |
| 9,515,994 B2* | 12/2016 | Kaushik | ............. | H04L 63/0281 |
| 10,331,913 B2* | 6/2019 | Segev | ................. | G06F 21/6227 |
| 10,778,684 B2* | 9/2020 | Gupta | ................. | H04L 63/0281 |
| 10,922,273 B1* | 2/2021 | Hoang | ................. | G06F 16/313 |
| 10,951,708 B2* | 3/2021 | Daniel | ................. | G06F 16/1824 |
| 11,144,663 B2* | 10/2021 | Yavuz | .................... | G06F 16/13 |
| 11,263,181 B1* | 3/2022 | Firestone | ................ | H04L 9/085 |
| 2015/0039885 A1* | 2/2015 | Cash | .................... | H04L 9/0894 |
| | | | | 713/165 |

(Continued)

FOREIGN PATENT DOCUMENTS

CN    112182630 A    1/2021

OTHER PUBLICATIONS

Cash et al., Highly-Scalable Searchable Symmetric Encryption with Support for Boolean Queries, Crypto, 2013, 45 pages.

(Continued)

*Primary Examiner* — Backhean Tiv
(74) *Attorney, Agent, or Firm* — Dinsmore & Shohl LLP

(57) ABSTRACT

A database is stored on a first cloud server to store encrypted files. A table stored at a second cloud server is a key value store, wherein the keys are unique secret values and the values are encrypted database values. The unique secret values relate to a specific instance of an update operation of a specific keyword. An update operation may be adding a new file to the database or deleting a file from the database. Each unique secret value is associated with an encrypted database value. A file identifier can be extracted from the encrypted database value. A file identifier identifies the location of a file in the database in the first cloud server. Each time a file containing a keyword is added or deleted from the database, a new unique secret value is generated and added to the table along with its associated encrypted database value.

10 Claims, 12 Drawing Sheets

(56) References Cited

U.S. PATENT DOCUMENTS

| | | | | |
|---|---|---|---|---|
| 2015/0143112 | A1* | 5/2015 | Yavuz | G06F 21/6227 |
| | | | | 713/165 |
| 2015/0229611 | A1* | 8/2015 | Kaushik | H04L 63/0281 |
| | | | | 713/162 |
| 2016/0140179 | A1* | 5/2016 | Yuen | G06F 16/2455 |
| | | | | 707/769 |
| 2018/0260430 | A1* | 9/2018 | Tschudin | G06F 21/6263 |
| 2018/0285576 | A1* | 10/2018 | Cannings | G06N 3/02 |
| 2019/0340381 | A1* | 11/2019 | Yavuz | G06F 21/606 |
| 2021/0004479 | A1* | 1/2021 | Ithal | H04L 9/0897 |
| 2022/0103340 | A1* | 3/2022 | Xu | H04L 9/0643 |
| 2024/0056427 | A1* | 2/2024 | Abdelraheem | H04L 63/0435 |
| 2024/0056429 | A1* | 2/2024 | Abdelraheem | H04L 63/045 |

OTHER PUBLICATIONS

Hirano et al., Simple, Secure, and Efficient Searchable Symmetric Encryption with Multiple Encrypted Indexes, Springer International Publishing Switzerland, 2016, pp. 91-110.

* cited by examiner

PRIVATE SEARCH SERVICE

BACKGROUND

Searchable encryption as a service enables a Client to outsource the storage of encrypted documents to the cloud and later search and retrieve the documents without decryption on the cloud.

A Dynamic Searchable Symmetric Encryption (DSSE) scheme supports additions and deletions of new documents. One important feature required by DSSE schemes is forward privacy (or forward security) which implies that the past search results do not reveal any information about the newly added documents. In other words, the newly added documents cannot be related to previous search results. As mentioned before forward privacy has become a requirement for DSSE schemes because they prevent the adaptive file-injection attacks as set out in Yupeng Zhang, Jonathan Katz, and Charalampos Papamanthou. 2016. All your queries are belong to us: the power of file-injection attacks on searchable encryption. In Proceedings of the 25th USENIX Conference on Security Symposium (SEC'16). USENIX Association, USA, 707-720.

Each keyword in a user's database is transformed to a secret search token using a cryptographic function that takes the user secret key and a keyword as an input.

A generic method to achieve forward privacy is to generate a new search token after each update operation as follows. Given a keyword w, during the $i^{th}$ update operation for the keyword w, (wherein an update operation may be adding a file to an encrypted database, deleting a file from the encrypted database or modifying a file in the encrypted database) the client generates the token $H(c|w|K)$ where H is a cryptographic hash function, K is a secret key and c is a counter that is incremented whenever the keyword w is involved in an update operation. The counter is stored either at the client or the server. Now, when searching for the keyword w, the client needs to send all the search tokens, $H(i|w|K)$ where $0 \le i \le c$ to the server. This provides forward privacy but at the cost of increasing the communication size of the messages sent from the client to the server. This is because c depends on the frequency of the keyword and so in practice, c will be large, so this method does not scale very well. An example forward privacy scheme is set out in Bost, Raphael. (2016). οφος: Forward Secure Searchable Encryption. 1143-1154. 10.1145/2976749.2978303.

The present invention uses multiple hash chains to provide forward privacy where hash chains can be constructed using the efficient computation technique (O(log n) time and storage) proposed in Coppersmith and Jakobsson (2003): Almost Optimal Hash Sequence Traversal, Financial Cryptography. FC 2002, LNCS, vol 2357, Springer. The use of multiple hash chains and the efficient hash chain traversal addresses the two issues about using hash chains discussed in Song et al. (2018): Forward Private Searchable Encryption with Optimized I/O Efficiency, namely, limiting the number of update operations and using the naïve implementation to traverse the hash chain.

SUMMARY

The present invention in its various aspects is as set out in the appended claims.

This provides:

A method for providing a dynamic searchable symmetric encryption scheme having forward privacy the method comprising:

by a client device:
  creating an unencrypted file;
  creating a list of keywords present in the file;
  encrypting the file and uploading it to a first cloud server;
by a client update module of the client device:
  for each keyword on the list of keywords:
    computing a unique secret value, u; wherein u relates to a specific instance of an update operation of a specific keyword; and
    computing an encrypted database value; wherein the encrypted database value contains information about the file, the information including at least the file identifier;
  calling a server update module of a second cloud server; wherein the second cloud server stores an encrypted table, T, wherein T has a first column and a second column;
  wherein the server update module inserts the unique secret value into the first column of T, and inserts the encrypted database value into the second column of T.

The present invention may provide a database, stored on a first cloud server and an encrypted index table, T, stored on a second cloud server. The database stored on the first cloud server is configured to store encrypted files. The encrypted index table stored at the second cloud server may be a key value store, wherein the keys are unique secret values that are unique to each keyword and the values are encrypted database values. The encrypted database values contain information about the files, the information including at least the file identifier.

The unique secret values for each keyword relate to a specific instance of an update operation of a specific keyword. An update operation may be adding a new file to the database stored on the first cloud server. An update operation of a specific keyword is therefore adding a file that contains the specific keyword.

A file identifier may be extracted from the encrypted database value. A file identifier identifies at least the location of a file in the database in the first cloud server. Each time a file containing a keyword is added or deleted from the database, a new unique secret value for the keyword is generated and added to the encrypted index table along with its associated encrypted database value.

A user may interrogate the encrypted index table stored at the second cloud server to identify all the unique secret values associated with a user selected keyword. The user may then retrieve all the encrypted database values and extract file identifiers from them. The user may then use the file identifiers to find all the files containing the user selected keyword in the database stored on the first cloud server. The user may then download and decrypt the files containing the user selected keyword.

The present invention enables encrypted documents containing a search term to be identified. The search keywords and documents remain encrypted on the cloud server—they are only decrypted on the user's local machine after they have been downloaded. The documents may be decrypted with a private key which is not shared with the server.

The search keywords may not be decrypted at the server since the key is not known to the server. Searchable encryption allows a user to find encrypted documents containing one or more keywords without decrypting the keywords. Once the encrypted documents are located the client may decrypt them using the corresponding secret key for each document. These keys can be easily derived from a client master secret key. The present invention may utilise any of the many known methods to provide unique, document specific, encryption keys. For example, this could be done using the document identifier number, i. So, if $K_F$ is the client master secret key, the key for a document with identifier i could be $K_{F_i}=KDF(K_F, i)$ where KDF is a Key Derivation Function.

DETAILED DESCRIPTION

Updating and Searching with Single Keyword Search Capacity

In one aspect, the present invention provides a method for providing a dynamic searchable symmetric encryption scheme having forward privacy, the method comprising:

By a client device, creating an unencrypted file and identifying individual words in the file. The file may be a text file or an audio file. If the file is a text file, identifying individual words in the file may comprise identifying all the different words in the text file, and the number of instances of each of the different words in the text file. If the file is an audio file, the client device uses on device automatic speech recognition to generate a transcript of the audio file. The on-device speech recognition system may use a lexicon. Identifying individual words in the file may therefore comprise identifying all the different words in the transcript, and the number of instances of each of the different words in the transcript.

For each identified word in the file, the client device determines if the word is a keyword. A keyword may be defined as a word belonging to the lexicon. The lexicon being a list of keywords recognised by the on-device speech recognition system. If the word is determined to be a keyword, the word is added to a list of keywords. The list of keywords therefore contains all of the keywords present in the created file.

Identifying if a word is a keyword may be achieved by additionally comparing the identified words to a list of non-keywords. If an identified word does not match any of the words on the list of non-keywords then it is a keyword. For files in the English language, non-keywords are the most common English words and include but are not limited to: the, a, an, of, it, hello. These words are not useful for the identification of a specific file as they are likely to be present in most or all of the files.

For each keyword on the list of keywords, the client device generates an object, fileUInfo, which is a software data structure which contains a file identifier, file name, number of occurrences of the keyword and timestamp. The file identifier provides the location of the file on the first cloud server. The file identifier therefore allows the client to locate and retrieve the file from the first cloud server. When a user searches for files containing a keyword, the number of occurrences of the keyword may allow the present invention to rank the search results according to which file has the most occurrences of the keyword.

The client device then encrypts the file using a unique secret key and uploads it to a first cloud server.

Each document on the first cloud server has its own unique secret key which can be derived from a single master file encryption key, $K_F$. For example, this could be done using the document identifier number, i. So, the key for a document with identifier i could be $K_{F_i}=KDF(K_F, i)$ where KDF is a key derivation function.

The client device then calls a client update module of the client device. For each keyword on the list of keywords, the client update module of the client device computes a unique secret value and computes an encrypted database value. The Encrypted database value representing the encrypted information about the file containing the keyword under consideration.

Computing the encrypted database value may comprise encrypting fileUinfo using the client's private key. The encrypted version of fileUinfo is known as e and the encrypted database value is equal to e.

The client update module calls a server update module of a second cloud server.

The second cloud server stores an encrypted index table, T, wherein T has a first column and a second column. The first column contains unique secret values and the second column contains encrypted database values. The encrypted index table is therefore a data structure that can be searched to identify file identifiers contained in fileUinfo and therefore the location of an encrypted document.

An encrypted index table may be created per user. This is preferable from a security perspective, as each encrypted index table is individual for each user.

Alternatively, a single encrypted index table may be available for all users. This provides a scalable encrypted search service. Using a single encrypted index table per each user requires increased storage capacity as opposed to a shared encrypted index table.

The server update module inserts the unique secret value into the first column of T, and inserts the encrypted database value into the second column of T.

Computing the unique secret value may comprise:

The client device providing a hash chain length (n), a local database and an array (K), wherein K contains a plurality of secret keys, K is preferably an array of length 5 that contains five random secret keys, K[0], K[1], K[2], K[3] and K[4].

n dictates the length of the hash chains to be generated when computing the unique secret value.

The use of hash chains enables forward privacy. To generate a hash chain, the length of the hash chain needs to be set in advance. The length of the hash chain cannot be equal to the number of update operations or the number of files that will be processed by the scheme as this cannot be known in advance. The invention overcomes this by generating a new chain after each 'n' update operations for each corresponding keyword. Thus, the invention enables forward privacy using several hash chains, each of length 'n'. The use of forward privacy in a Dynamic Searchable Symmetric Encryption scheme prevents adaptive file-injection attacks.

The local database provides information on the number of updates associated with a keyword; it is the encrypted index table that is where the information on the files is stored in the database stored on the first cloud server.

The local database is stored at the client device. The local database is a key-value store, wherein the key represents a keyword and the value represents a record in the form of a tuple, $s=(st_c, c, h_c)$, where c is a counter representing the number of updates of the keyword within the current hash chain, $h_c$ is a hash chain counter incremented by one every time n updates of the key represented by the key are completed, and $st_c$ represents a current hash chain value;

The client update module can then compute the unique secret value by:

Searching for the local database for a record that corresponds to the keyword.

If there is no record that corresponds to the keyword, the client update module will initialise the first hash chain for the keyword by:

setting $h_c=-1$
setting $h_c=h_c+1$, i.e., $h_c=0$
setting $c=-1$

The above steps ensure that the hash chain counter values, $h_c$, will start from $h_c=0$ for the first hash chain and the counter values, c, will start at $c=0$. This is because following these initialisation steps, c will be increased by 1 when the update takes place and therefore will equal zero for the first update associated with the first hash chain.

If a record corresponding to the keyword is found in the local database, but $c=n-1$, the client update module will initialise a new hash chain for the keyword by:

setting $h_c=h_c+1$
$c=-1$

Setting $h_c=h_c+1$ ensures that the next hash chain computed will be the $h_c+1^{th}$ hash chain. Setting $c=-1$ ensures that and the counter values, c, will start at $c=0$. This is because following these initialisation steps, c will be increased by 1 when the update takes place and therefore will equal zero for the first update associated with the new hash chain.

The client update module initialises a new hash chain when $c=n-1$ because otherwise the next value of c would be $c=n$ which would not correspond to a value in the hash chain.

The client update module then sets a status, wherein the status is equal to $(h_c|K|w)$ wherein K[2] is a third secret key, stored in K and w is the keyword.

The client update module then constructs a hash chain Constructing the hash chain may be achieved by iterating a hash function, H0, over the status n times such that:
the first entry in the hash chain=HashChain[0]=$H_0$(status),
the second entry in the hash chain=HashChain[1]=$H_0^2$(status),
the third entry in the hash chain=HashChain[2]=$H_0^3$(status)
the final entry in the hash chain=HashChain[n-1]=$H_0^n$(status).

The client update module then updates the local database by setting $c=c+1$; and setting $st_c$ equal to the HashChain[n-c]. Hash functions are non-invertible, (i.e., one way, given H(x), it is difficult to find x). Therefore, the server, given $st_c$=HashChain[n-c] will not be able to generate the value of $st_c$ associated with the next update of the keyword.

The client update module then computes a unique secret value, u, from $st_c$ by generating a search token, $t_w$, and setting $u=H_1(t_w|st_c)$.

$H_1$ is a hash function and $t_w=PRF_1(K[0], w)$. $PRF_1$ is a first pseudorandom function, K[0] is a first secret key, stored in K and w is the keyword. It is preferable for increased security that $H_0$ and $H_1$ are different Hash Functions. $PRF_1$ takes as input a k-bit secret key, K[0], and the input keyword and returns a k-bit output.

One advantage the present invention may be realised by comparison with a single-encryption chain as done for example by 'FAST'. The present invention may not store any extra information to achieve forward-privacy while 'FAST' stores the encryption of the secret keys used to construct the encryption chain. That means the present invention may save 16 bytes per each pair of keyword and file identifier. So, if there are 1 million files in the database where each file has 100 unique keywords, then the present invention may save around 1.6 GB in comparison to 'FAST'. Also 'FAST' has a single encryption chain and thus it does not support parallel search making it slower than the present invention.

The value of n may be determined by considering the following factors: Increasing the value of n slows the update process. Decreasing the value of n increases the number of hash chains which will increase the size of the payload during the Client's multi-keyword search but the significant increase comes mainly from the OXT protocol which computes and sends xtoken[j, i] values. Increasing the number of hash chains is beneficial since parallel searches can be run on each chain since they are independent. So, a good trade-off could be to determine the maximum number of hash chains that is allowed since the payload of the current cloud functions is limited. The multi keyword search may be considered for the value of n even in the single keyword case to allow for an implementation where both single and multi-keyword searches are supported.

For example, the input size of AWS Lambda is currently limited to 6 MB.

For the example of a multi keyword query, then the input size will be at most $$\text{size of } xtoken[j,i] \times h_c \times n \times (t-1) + \text{size of } h_c + \text{size of } t_w + \text{size of } ctr[r] + (\text{size of } st[r]) \times h_c$$

Apart from $h_c$, n and t, all the other values are fixed by the chosen parameters (elliptic curve (size of xtoken[j, i]), hash function $H_0$(size of st[r]), $PRF_1$ (size of $t_w$), size of integers (size of $h_c$ and size of ctr[r])). Therefore, one can easily upper-bound the number of hash chains by fixing n since we know that the above input size is less than 6 MB. For example, assuming that the size of integer is 4 bytes and that we are using an elliptic curve of size 256-bit where EC points are compressed which means size of xtoken[j, i] is 33 bytes, and the size of $t_w$ and st[r] is 32 bytes each, then we can have the following inequality when we have two keywords in the multi-query (t=2), $$33 \times h_c \times n + 4 + 32 + 4 + 32 \times h_c < 6 \times 1024 \times 1024$$

Now, setting $n=6\times1024=6144$, gives $h_c<32$ which means we cannot have more than 31 hash chains when n is set to 6144. To avoid this limitation, one could call the Lambda function more than once where different hash chains are passed to fetch the search results for a multi-keyword query.

The number of hash chains '$h_c$' can be set to the number of parallel searches that needs to be performed. Each process can be an execution of a cloud function (e.g., AWS Lambda service, Azure functions, Google functions, etc.).

In some cases, it may be preferable that n is between 1000 and 20000, it may further be preferable that n is between 5000 and 10000.

In another aspect, the present invention provides a method for performing a single keyword search of an encrypted index table wherein the encrypted index table has been updated using the method set out above.

The encrypted index table is stored at a second server and has a first column and a second column.

The first column contains unique secret values and the second column containing encrypted database values.

A method of the present invention may provide, by a client device, receiving a user inputted keyword.

The method of the present invention may further comprise, by a client single keyword search module of the client device, searching, in the local database, for a keyword that matches the inputted keyword. If a keyword that matches the inputted keyword is found in the local database, the method may further comprise obtaining, from the local database, the record associated with the inputted keyword.

The method of the present invention may yet further comprise the client single keyword search module deriving information from the record. Deriving information from the record may comprise generating a list of counters. Generating a list of counters may comprise:
  setting the first entry in the list of counters=ctr[$h_c$]=c; wherein c is taken from the record;
  setting the second entry in the list of counters= ctr[$h_c-1$]=n−1;
  the third entry in the list of counters=ctr[$h_c-2$]=n−1; and so on until
  the final entry in the list of counters=ctr[0]=n−1;
  Generating a list of $st_c$s; wherein generating a list of $st_c$s may comprise:
  setting the first entry in the list of $st_c$s=st[$h_c$]=$st_c$; wherein $st_c$ is taken from the record;
  setting the second entry in the list of $st_c$s=st[$h_c-1$]=$H_0$ ($h_c-1|k[2]|w$); wherein k[2] is a third secret key and w is the keyword;
  the third entry in the list of $st_c$s=st[$h_c-2$]=$H_0(h_c-2|k[2]|w)$; and so on until
  the final entry in the list of $st_c$s=st[0]=$H_0(0|k[2]|w)$;
generating a search token tw; wherein tw=$PRF_1(K[0],w)$ and PRF1 is a first pseudorandom function and K[0] is a first secret key and w is the keyword;

The information derived from the record may therefore comprise the list of counters, the list of $st_c$s and the search token.

Following deriving information from the record, the method may further comprise sending, by the client single keyword search module, the information derived from the record to a server single keyword search module.

The method may further comprise the server single keyword search module using the information derived from the record to compute all the unique secret values associated with the keyword. using the information derived from the record to compute all the unique secret values associated with the keyword may comprise:
  for $h_i=h_c$ to $h_i=0$ decreasing in steps of 1:
    for c=ctr[$h_c$] to c=0 decreasing in steps of 1:
      computing the unique secret value=$H_1(tw|st_c)$; wherein $st_c=H_0{}^{n-c}(h_c|k[2]|w)$.

For each unique secret value associated with the keyword the server single keyword search module adds the corresponding encrypted database value to a result list then returns the result list to the client single keyword search module of the client device.

The client single keyword search module of the client device will then decrypt the encrypted database values using the client's private key and extract file identifiers from the decrypted database values. The client device may therefore use the file identifiers to locate and download the encrypted files that contain the keyword from the first cloud server.

The client may outsource the documents to be stored store on the cloud, use a unique secret key to encrypt the documents before sending sent them to the cloud. The client has When searching, the client may search for the files they want to retrieve (using encrypted keywords and the SSE scheme) and downloaded them they can use the unique secret key to decrypt them. In the present invention, the cloud never sees the unique secret key and is therefore not capable of decrypting any of the client's stored documents. Once the SSE scheme identifies the documents the client is interested, it simply provides the client with the list of retrieved documents from the search. The client simply downloads them and decrypts them. A previously mentioned, each document may have its own secret key which can be derived from a single master file encryption key, $K_F$. For example, this could be done using the document identifier number, i. So, the key for a document with identifier i could be $K_{F_i}$=KDF ($K_F$, i) where KDF is a Key Derivation Function.

Without SSE, to find the encrypted document they were looking for on the cloud, the client may have to download the entire cloud database to their local machine, then decrypt everything, and then search for the documents they are interested in. SSE therefore provides the facility to outsource the encrypted document storage to the cloud (where it is regularly backed up etc.) and provides the capability to search the encrypted document database without exposing the document contents to the cloud server. So, although the documents are outsourced to the cloud, if the cloud is breached, everything is encrypted and hence all the attacker gets are encrypted documents that they cannot decrypt.

The searchable encryption scheme of the present invention preferably assumes that the Cloud Function Server is honest-but-curious.

If the client device is a voice assistant device and the user inputted keyword is received in the form of spoken audio, the client device preferably uses on-device Automatic Speech Recognition, ASR, to convert the inputted keyword to text. It is important that the client uses on-device ASR. If the file to be uploaded to the cloud is an audio file, the transcript is generated on the client device using on-device ASR, it is then encrypted with a unique secret key and sent to the cloud. The Searchable Symmetric Encryption (SSE) scheme is then used to provide the means to later search and retrieve transcripts in the cloud database as required. If ASR was performed online then there would be no security as the cloud server would 'see' what the transcript contains prior to its encryption.

If the client device is a voice assistant device, the method may further include replaying the audio of the retrieved file with the most instances of the keyword.

Updating and Searching with Multi-Keyword Search Capacity

In one aspect, the present invention provides a method for providing a dynamic searchable symmetric encryption scheme having forward privacy, the method comprising:

By a client device, creating an unencrypted file and identifying individual words in the file. The file may be a text file or an audio file. If the file is a text file, identifying individual words in the file may comprise identifying all the different words in the text file, and the number of instances of each of the different words in the text file. If the file is an audio file, the client device uses automatic speech recognition to generate a transcript of the audio file. Identifying individual words in the file will therefore comprise identifying all the different words in the transcript, and the number of instances of each of the different words in the transcript.

The client device may be a computer, a voice assistant device or a smart phone.

For each identified word in the file, the client device determines if the word is a keyword. If the word is determined to be a keyword, the word is added to a list of keywords. The list of keywords therefore contains all of the keywords present in the file.

Identifying if a word is a keyword may be achieved by comparing the identified words to a list of non-keywords. If an identified word does not match any of the words on the list of non-keywords then it is a keyword. For files in the English language, non-keywords are the most common English words and include but are not limited to: the, a, an, of, it, hello. These words are not useful for the identification of a specific file as they are likely to be present in most or all of the files.

For each keyword on the list of keywords, the client device generates an object, fileUInfo, which contains a file identifier, file name, number of occurrences of the keyword and timestamp. The file identifier provides the location of the file on the first cloud server. When a user searches for files containing a keyword, the number of occurrences of the keyword may allow the present invention to rank the search results according to which file has the most occurrences of the keyword.

The client device then encrypts the file using unique secret key and uploads it to a first cloud server.

Each document on the first cloud server has its own unique secret key which can be derived from a single master file encryption key, $K_F$. For example, this could be done using the document identifier number, i. So, the key for a document with identifier i could be $K_{F_i}=KDF(K_F, i)$ where KDF is a key derivation function.

The client device then calls a client update module of the client device. For each keyword on the list of keywords, the client update module of the client device computes a unique secret value and computes an encrypted database value.

Computing the encrypted database value may comprise: Encrypting fileUinfo (The encrypted version of fileUinfo may be known as e) using the clients private key, calling a modified OXT protocol module of the client device; wherein the modified OXT protocol module computes m=($y_c$, xtag) and returns m to the client update module; wherein $y_c$ and xtag are parameters that facilitate multi keyword searching, and setting the encrypted database value to equal to e concatenated with $y_c$.

The modified OXT protocol differs from the known OXT protocol in that the present invention modifies the value '$z_c$' by involving the hash chain counter '$h_c$' together with the counter 'c' rather than using the counter 'c' only as done in the original OXT protocol. This allows the multi keyword search capabilities of the OXT protocol to be combined with the forward privacy provided by the use of hash chains. More precisely, the invention replaces:

$$z_c=PRF_3(skey_1,c)$$

by $$z_c=PRF_3(skey_1,c|h_c)$$

in the OXT protocol. PRF3 is a pseudorandom function. Preferably $PRF_3$ is different to $PRF_1$. $skey_1$ is a secret key which is part of skey. skey is split into two parts, skey[0] (or $skey_0$) and skey[1] (or $skey_1$).

The client update module calls a server update module of a second cloud server.

The second cloud server stores an encrypted index table, T, wherein T has a first column and a second column.

An encrypted index table may be created per user. This is preferable from a security perspective, as each encrypted index table is individual for each user.

Alternatively, a single encrypted index table may be available for all users. This provides a scalable encrypted search service. Using a single encrypted index table per each user requires increased storage capacity as opposed to a shared encrypted index table.

The server update module inserts the unique secret value into the first column of T, and inserts the encrypted database value into the second column of T.

Computing the unique secret value may comprise:

The client device providing an array, K (wherein K contains a plurality of secret keys), a hash chain length, n, and a local database.

K is preferably an array of length 5 that contains five random secret keys, K[0], K[1], K[2], K[3] and K[4]. n dictates the length of the hash chains to be generated when computing the encrypted database key. The use of hash chains enables forward privacy. To generate a hash chain, the length of the hash chain needs to be set in advance. The length of the hash chain cannot be equal to the number of update operations or the number of files that will be processed by the scheme as this cannot be known in advance. The invention overcomes this by generating a new chain after each 'n' update operations for each corresponding keyword. Thus, the invention enables forward privacy using several hash chains, each of length 'n'. The use of forward privacy in a Dynamic Searchable Symmetric Encryption scheme prevents adaptive file-injection attacks.

The local database is stored at the client device. The local database is a key-value store, wherein the key represents a keyword and the value represents a record in the form of a tuple, s=($st_c$, c, $h_c$) where c is a counter representing the number of updates of the keyword within the current hash chain, $h_c$ is a hash chain counter incremented by one every time n updates of the key represented by the key are completed, and $st_c$ represents a current hash chain value;

The client update module can then compute the encrypted database key by:

Searching for the local database for a record that corresponds to the keyword.

If there is no record that corresponds to the keyword, the client update module will initialise the first hash chain for the keyword by:

setting $h_c$=−1
setting $h_c$=$h_c$+1, i.e., $h_c$=0
setting c=−1

The above steps ensure that the hash chain counter values, $h_c$, will start from $h_c$=0 for the first hash chain and the counter values, c, will start at c=0. This is because following these initialisation steps, c will be increased by 1 when the update takes place and therefore will equal zero for the first update associated with the first hash chain.

If a record corresponding to the keyword is found in the local database, but c=n−1, the client update module will initialise a new hash chain for the keyword by:

setting $h_c$=$h_c$+1
c=−1

Setting $h_c$=$h_c$+1 ensures that the next hash chain computed will be the $h_c$+$1^{th}$ hash chain. Setting c-=−1 ensures that and the counter values, c, will start at c=0. This is because following these initialisation steps, c will be increased by 1 when the update takes place and therefore will equal zero for the first update associated with the new hash chain.

The client update module initialises a new hash chain when c=n−1 because otherwise the next value of c would be c=n which would not correspond to a value in the hash chain.

The client update module then sets a status, wherein the status is equal to ($h_c$|K[2]|w) wherein K[2] is a third secret key, stored in K and w is the keyword.

The client update module then constructs a hash chain. Constructing the hash chain may be achieved by iterating a hash function, H0, over the status n times such that:

the first entry in the hash chain=HashChain[0]=$H_0$(status),
the second entry in the hash chain=HashChain[1]=$H_0^2$(status),
the third entry in the hash chain=HashChain[2]=$H_0^3$(status), and so on until the final entry in the hash chain=Hashchain[n−1]=$H_0{}^n$ (status).

The client update module then updates the local database by setting c=c+1; and setting $st_c$=equal to the HashChain [n−c]. Hash functions are non-invertible, (i.e., one way, given H(x), it is difficult to find x). Therefore, the server, given $st_c$=HashChain[n−c] will not be able to generate the value of $st_c$ associated with the next update of the keyword.

The client update module then computes a unique secret value, u, from $st_c$ by generating a search token, tw and setting u=$H_1$(tw| $st_c$). $H_1$ is a hash function and tw=$PRF_1$(K[0],w). $PRF_1$ is a first pseudorandom function, K[0] is a first secret key, stored in K and w is the keyword. It is preferable for increased security that $H_0$ and $H_1$ are different Hash Functions. $PRF_1$ takes as input a k-bit secret key, K[0], and the input keyword and returns a k-bit output.

One advantage the present invention may be realised by comparison with a single-encryption chain as done for example by 'FAST'. The present invention may not store any extra information to achieve forward-privacy while 'FAST' stores the encryption of the secret keys used to construct the encryption chain. That means the present invention may save 16 bytes per each pair of keyword and file identifier. So, if there are 1 million files in the database where each file has 100 unique keywords, then the present invention may save around 1.6 GB in comparison to 'FAST'. Also 'FAST' has a single encryption chain and thus it does not support parallel search making it slower than the present invention.

The value of n may be determined by considering the following factors: Increasing the value of n slows the update process. Decreasing the value of n increases the number of hash chains which will increase the size of the payload during the Client's multi-keyword search but the significant increase comes mainly from the OXT protocol which computes and sends xtoken[j, i] values. Increasing the number of hash chains is beneficial since parallel searches can be run on each chain since they are independent. So, a good trade-off could be to determine the maximum number of hash chains that is allowed since the payload of the current cloud functions is limited.

For example, the input size of AWS Lambda is currently limited to 6 MB.

For the example of a multi keyword query, then the input size will be at most size of xtoken[j,i]×$h_c$×n×(t−1)+size of $h_c$+size of $t_w$+size of ctr[r]+(size of st[r])×$h_c$ Apart from $h_c$, n and t, all the other values are fixed by the chosen parameters (elliptic curve (size of xtoken[j, i]), hash function $H_0$(size of st[r]), $PRF_1$ (size of $t_w$), size of integers (size of $h_c$ and size of ctr[r])). Therefore, one can easily upper-bound the number of hash chains by fixing n since we know that the above input size is less than 6 MB. For example, assuming that the size of integer is 4 bytes and that we are using an elliptic curve of size 256-bit where EC points are compressed which means size of xtoken[j, i] is 33 bytes, and the size of $t_w$ and st[r] is 32 bytes each, then we can have the following inequality when we have two keywords in the multi-query (t=2), 33×$h_c$×n+4+32+4+32×$h_c$<6×1024×1024

Now, setting n=6×1024=6144, gives $h_c$<32 which means we cannot have more than 31 hash chains when n is set to 6144. To avoid this limitation, one could call the Lambda function more than once where different hash chains are passed to fetch the search results for a multi-keyword query.

The number of hash chains '$h_c$' can be set to the number of parallel searches that needs to be performed. Each process can be an execution of a cloud function (e.g., AWS Lambda service, Azure functions, Google functions, etc.).

In another aspect, the present invention provides a method for performing a multi keyword search of an encrypted index table wherein the encrypted index table has been updated using the method set out above.

The encrypted index table is stored at a second server and has a first column and a second column. The first column contains unique secret values and the second column containing encrypted database values.

The method provides, by a client device, receiving a plurality of user inputted keywords.

The method may further comprise, by a client multi-keyword search module of the client device, searching, in the local database, for a keyword that matches the first user inputted keyword. If a keyword that matches the first user inputted keyword is found in the local database, the method further comprises obtaining, from the local database, the record associated with the first user inputted keyword.

The method may further comprise the client multi-keyword search module deriving information from the record. Deriving information from the record may comprise generating a list of counters. Generating a list of counters may comprise:

setting the first entry in the list of counters=ctr[$h_c$]=c; wherein c is taken from the record;
setting the second entry in the list of counters= ctr[$h_c$−1]=n−1;
the third entry in the list of counters=ctr[$h_c$−2]=n−1; and so on until
the final entry in the list of counters=ctr[0]=n−1;
Generating a list of $st_c$s; wherein generating a list of $st_c$s may comprise:
setting the first entry in the list of $st_c$s=st[$h_c$]=$st_c$; wherein $st_c$ is taken from the record;
setting the second entry in the list of $st_c$s=st[$h_c$−1]=$H_0$($h_c$−1| k[2]|w); wherein k[2] is a third secret key and w is the keyword;
the third entry in the list of $st_c$s=st[$h_c$−2]=$H_0$($h_c$−2|k[2] |w); and so on until
the final entry in the list of $st_c$s=st[0]=$H_0$(0| k[2]|w);
generating a search token tw; wherein tw=$PRF_1$(K[0],w) and PRF1 is a first pseudorandom function and K[0] is a first secret key and w is the keyword;

The information derived from the record may therefore comprise the list of counters, the list of $st_c$s and the search token.

Following deriving information from the record, the method may further comprise sending, by the client multi-keyword search module, the information derived from the record to a server multi-keyword search module.

The method may further comprise the server multi-keyword search module using the information derived from the record to compute all the unique secret values associated with the first user inputted keyword. Using the information derived from the record to compute all the unique secret values associated with the first user inputted keyword may comprise:

for $h_i$=$h_c$ to $h_i$=0 decreasing in steps of 1:
  for c=ctr[$h_c$] to c=0 decreasing in steps of 1:
    computing the unique secret value=$H_1$(tw|$st_c$); wherein $st_c$=$H_0{}^{n-c}$ ($h_c$|k[2]|w).

For each unique secret value associated with the first user inputted keyword the server multi-keyword search module:

Fetches the corresponding encrypted database value. The encrypted database value may comprise e concatenated with yc. This step finds all the database values associated with files that contain the first user inputted keyword.

To check if each file that contains the first user inputted keyword also includes the remainder of the plurality of user inputted keywords, for each additional keyword, ($w_2$ to $w_t$ for "t" user inputted keywords) the server multi-keyword search module computes xtag from yc, and searches in a bloomfilter stored at the second server for the computed xtag values.

If xtag for each additional keyword is found in the bloom filter then the corresponding e is added to a result list as it is a valid search result for the multi keyword search query.

If any of the xtag values for any of the additional keywords are not found in the bloomfilter then the corresponding e value is not a valid search result for the multi-keyword query.

After the server multi-keyword search module has checked whether each file that contains the first user inputted keyword also includes the remainder of the plurality of user inputted keywords, the server multi-keyword search module returns the result list to the client single keyword search module of the client device.

The client multi keyword search module of the client device will then decrypt the encrypted database values using the client's private key and extract file identifiers from the decrypted database values. The client device may therefore use the file identifiers to locate and download the encrypted files that contain the keyword from the first cloud server.

Computing xtag from yc may be achieved by multiplying yc by an elliptic curve point yc and xtag are defined in more detail in D. Cash, S. Jarecki, C. Jutla, H. Krawczyk, M.-C. Roşu and M. Steiner, "Highly-scalable searchable symmetric encryption with support for boolean queries.," in *Crypto*, 2013. This reference introduces the OXT protocol that the present invention utilises. The client multi-keyword search module of the client device will then decrypt the encrypted database values using the client's private key and extract file identifiers from the decrypted database values. The client device may therefore use the file identifiers to locate and download the files that contain the keywords from the first cloud server.

The client may have outsourced the documents to be stored store on the cloud, used its private key to encrypt the documents before sending sent them to the cloud. The client may then search for the files they want to retrieve (using encrypted keywords and the SSE scheme) and downloaded them they can use their private key to decrypt them. In these cases, the cloud would not see the client's private key and is therefore not capable of decrypting any of the client's stored documents. Once the SSE scheme identifies the documents the client is interested in, it may simply provide the client with the list of retrieved documents from the search. The client may then simply download them and decrypt them.

Without SSE, to find the encrypted document they were looking for on the cloud, the client may have to download the entire cloud database to their local machine, then decrypt everything, and then search for the documents they are interested in. SSE provides the facility to outsource the encrypted document storage to the cloud (where it is regularly backed up etc.) and provides the capability to search the encrypted document database without exposing the document contents to the cloud server. So, although the documents are outsourced to the cloud, if the cloud is breached, everything is encrypted and hence all the attacker gets are encrypted documents that they cannot decrypt.

The searchable encryption scheme of the present invention preferably assumes that the Cloud Function Server is honest-but-curious. It uses two Cloud Functions, the first one performs single keyword search and the second one performs conjunctive keyword search. Note that the second function can be easily extended to perform any multi-keyword of the form $$w_1 \text{ AND } f(w_2, \ldots, w_{n_t})$$

If the client device is a voice assistant device and the user inputted keywords are received in the form of spoken audio, the client device uses on-device automatic speech recognition to convert the inputted keywords to text. It is important that the client uses on-device ASR. If the file to be uploaded to the cloud is an audio file, the transcript is generated on the client device using on-device ASR, it is then encrypted with a unique secret key and sent to the cloud. The Searchable Symmetric Encryption (SSE) scheme is then used to provide the means to later search and retrieve transcripts in the cloud database as required. If ASR was performed online then there would be no security as the cloud server would 'see' what the transcript contains prior to its encryption.

If the client device is a voice assistant device, the method may further include replaying the audio of the retrieved file with the most instances of the first user inputted keyword.

FIGURES

It is noted that in the figures, there are no superscripts or subscripts used, so in the figures hc is equivalent to $h_c$ and $st_c$ is equivalent to $st_c$ etc.

Figure 1A:
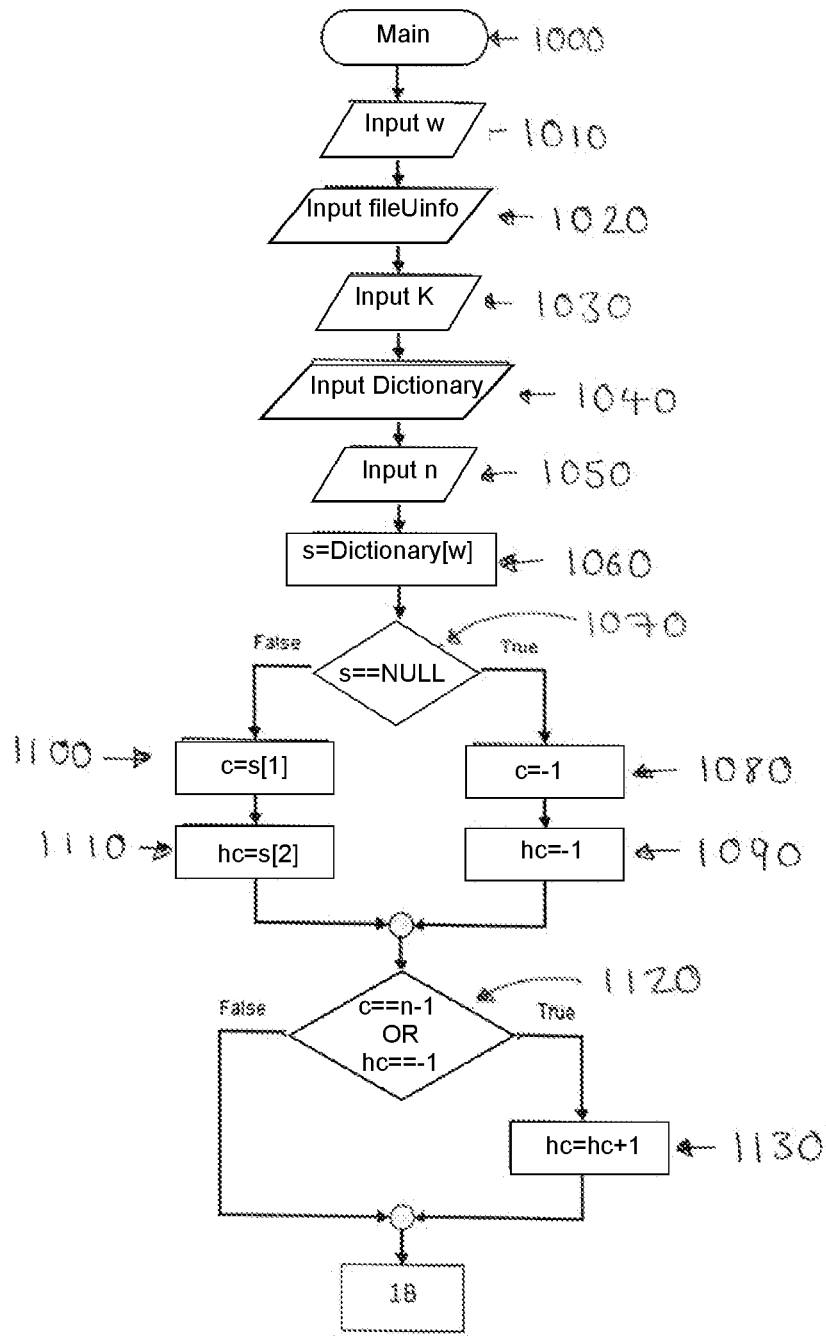
FIGS. 1A and 1B show an example algorithm for implementing the client update module in a multi keyword search supporting capacity.

In FIG. 1A, the client update module begins at step 1000.

at step 1010, the client update module takes as input "w", which is a keyword in the file that is to be uploaded to the cloud;

At step 1020, the client update module takes as input an Object "fileUinfo", fileUinfo contains a file identifier, file name, number of occurrences of the keyword and timestamp. The file identifier provides the location of the file on the first cloud server;

At step 1030, the client update module takes as input "K", wherein K is an array of 5 secret keys, K[0], K[1], K[2], K[3] and [K4].

At step 1040, the client update module takes as input a dictionary, wherein the dictionary is a local database stored at the client device, wherein the local database is a key-value store, wherein the key represents a keyword and the value represents a record in the form of a tuple, $s=(st_c, c, h_c)$, where c is a counter representing the number of updates of the keyword, $h_c$ is a hash chain counter incremented by one every time n updates of w are completed, and $st_c$ represents the hash chain value of the chain number $h_c+1$;

At step 1050, the client update module takes as input "n", wherein n represents a hash chain length;

At step 1060, the client update module extracts a record "s", relating to the keyword, w, from the dictionary.

In steps 1070 to 1110, if there is no record, s, corresponding to w, then c is set to −1 and $h_c$ is set to −1. If there is a record, s, corresponding to w, then c is set to the value of c in the record and $h_c$ is set to the value of $h_c$ in the record.

In steps 1120 and 1130, if c is equal to n−1 or $h_c$ is equal to −1, a new hash chain is launched by setting $h_c=h_c+1$.

Figure 1B:
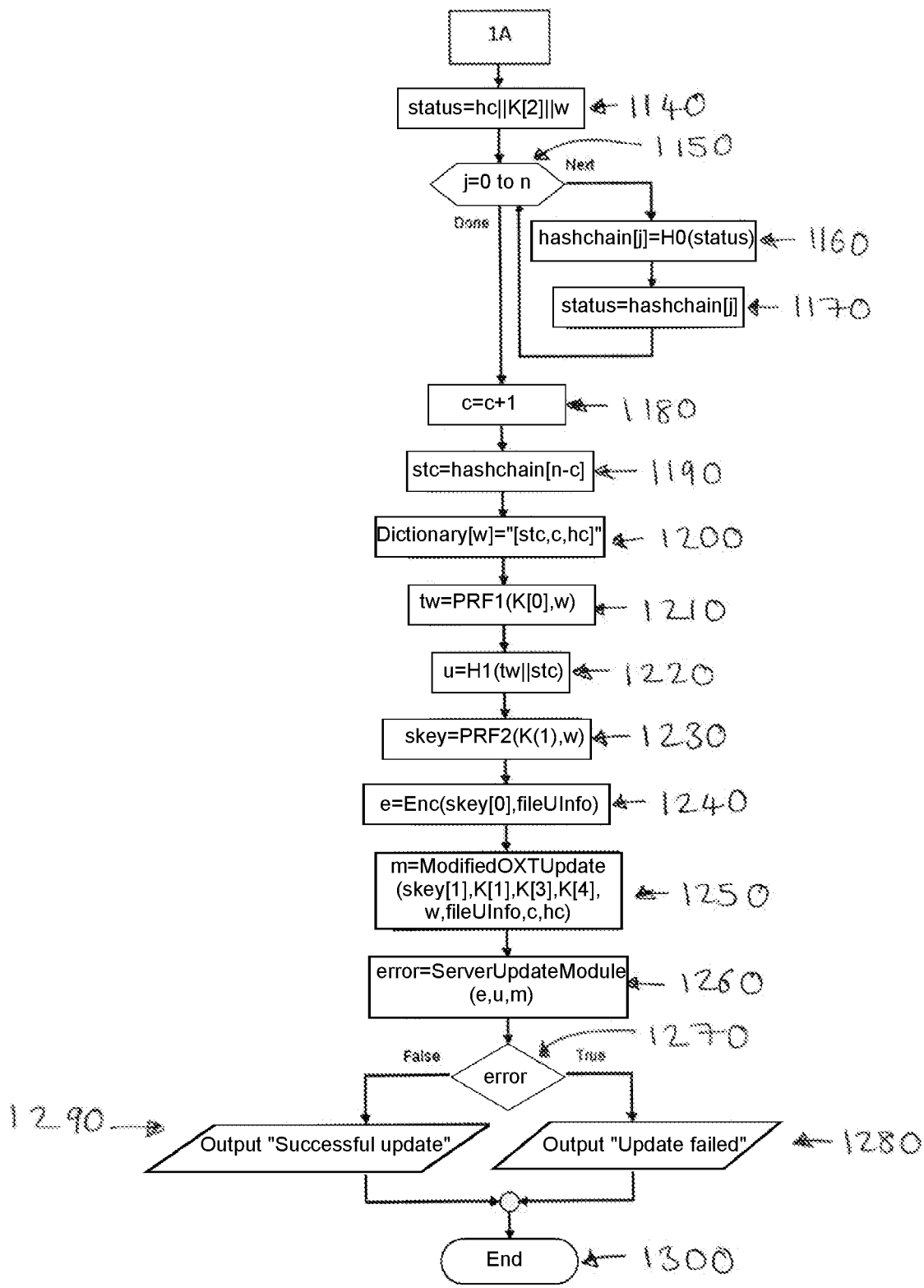

The client update module continues in FIG. 1B.

At step 1140, the client update module sets a status, wherein the status is equal to $(h_c | K[2]|w)$ wherein K[2] is a third secret key, stored in K and w is the keyword.

Over steps 1150 to 1170, the client update module constructs a hash chain iterating a hash function, H0, over the status n times such that:

the first entry in the hash chain=HashChain[0]=H0(status), the second entry in the hash chain=HashChain[1]=$H0^2$(status), the third entry in the hash chain=HashChain[2]=$H0^3$(status), and so on until the nth entry in the hash chain=HashChain[n−1]=$H0^n$(status).

At step 1180, the client update module sets c=c+1.

At step 1190, the client update module sets $st_c$=equal to the $(n-c)^{th}$ entry in the hash chain.

At step 1200, the client update module updates the record, s, in the dictionary with the new values of $st_c$, c and $h_c$.

At step 1210, the client update module generates a search token, tw; wherein tw=PRF1(K[0],w); wherein PRF1 is a first pseudorandom function, K[0] is a first secret key, and w is the keyword.

At step 1220, the client update module generates u, wherein u is a unique secret value, by setting u=H1(tw| $st_c$); wherein H1 is a hash function.

At step 1230, the client update module generates skey, wherein skey=PRF2(K[1],w) PRF2 is a second pseudorandom function ad K[1] is a second secret key. Skey is a unique key keyword for each keyword. So, if there are two files containing the same keyword 'w', the same 'skey' is generated but the encrypted form of fileUinfo (es) will always be different since each file has a unique file identifier or fileUInfo.

At step 1240, the client update module encrypts fileUinfo using skey[0], wherein skey[0] is the client's private key and is derived from skey, and the encrypted form of fileUinfo is known as e.

At step 1250, the client update module calls a modified OXT protocol, and sends skey[1] which is derived from skey, K[1], K[3], K[4], w, fileUinfo, c and $h_c$. to the protocol. The modified OXT protocol returns m. m=(yc, xtag) wherein yc and xtag are parameters that facilitate multi keyword searching.

At step 1260, the client update module calls the sever update module so as to update the encrypted index table stored at the server.

At steps 1270 the client update module determines whether the server update module returned an error.

If the server update module returns an error, at step 1280, the client update module reports that the update failed.

If the server update module has not returned an error, at step 1290, the client update module reports that the update was successful.

The client update module ends at 1300.

Figure 2:
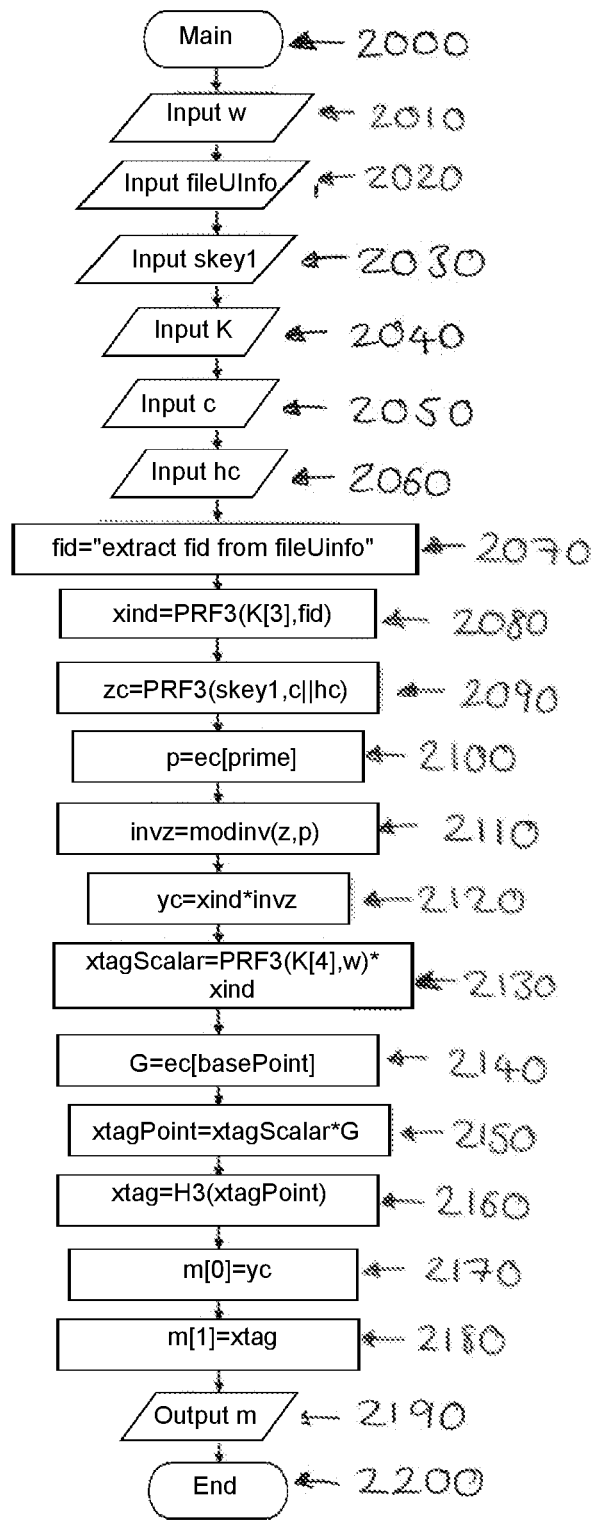
FIG. 2 shows the modified OXT protocol used by the present invention.

FIG. 2 shows a modified OXT protocol suitable for use by the present invention.

The modified OXT protocol begins at step 2000.

At steps 2010 the modified OXT protocol takes as input, the keyword w.

At step 2020 the modified OXT protocol takes as input fileUinfo

At step 2030, the modified OXT protocol takes as input skey1. Wherein skey1 is derived from skey (skey 1 is equivalent to skey[1]).

At step 2040 the modified OXT protocol takes as input K.

At step 2050 the modified OXT protocol takes as input c.

At step 2060 the modified OXT protocol takes as input $h_c$.

The modified OXT protocol of FIG. 2 is as set out in D. Cash, S. Jarecki, C. Jutla, H. Krawczyk, M.-C. Roşu and M. Steiner, "Highly-scalable searchable symmetric encryption with support for boolean queries.," in *Crypto*, 2013. This reference introduces the OXT protocol that the present invention utilises. The main difference between the OXT protocol presented in the paper cited above and the oxt protocol of the present invention is that the present invention replaces:

$$z_c=PRF3(skey1,c)$$

by $$z_c=PRF3(skey1,c\|h_c)$$

in the OXT protocol.

PRF3 is a pseudorandom function. Preferably PRF3 is different to PRF1. Skey1 is a secret key. This allows the multi keyword search capabilities of the OXT protocol to be combined with the forward privacy provided by the use of hash chains.

In steps 2070 to 2160 the modified OXT protocol computes the values yc and xtag. At steps 2170 and 2180 the modified OXT protocol sets m=(yc, xtag). At step 2190, the modified OXT protocol outputs m to the client update module.

The modified OXT protocol ends at step 2200.

Figure 3:
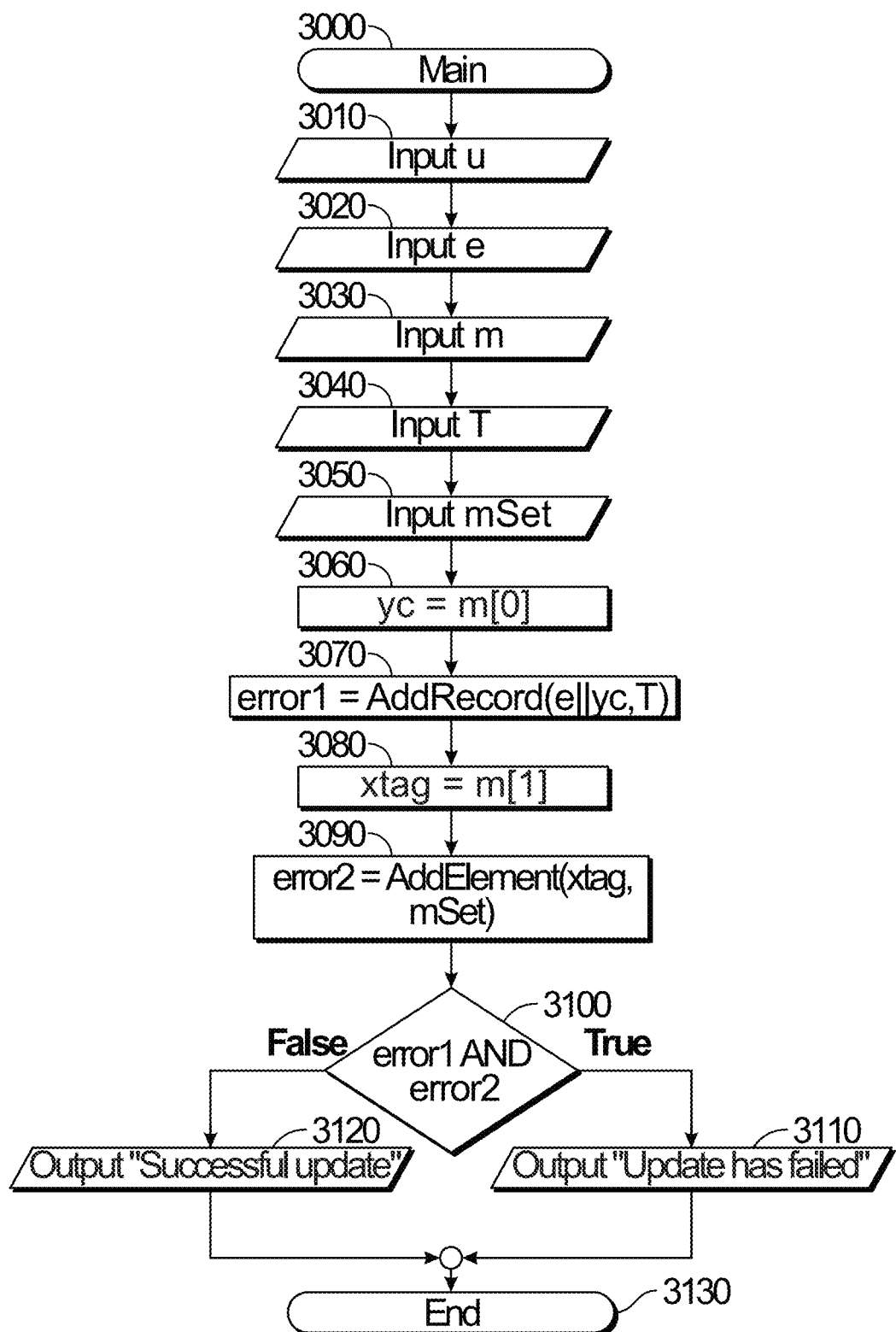
FIG. 3 shows an example algorithm for implementing the server update module in a multi keyword search supporting capacity.

FIG. 3 discloses a server update module.

The server update module starts at step 3000.

At step 3010 the server update module takes as input u, wherein u is the unique secret value computed by the client update module.

At step 3020 the server update module takes as input e, wherein e was computed by the client update module.

At step 3030 the server update module takes as input m, wherein m was computed by the modified OXT protocol.

At step 3040 the server update module takes as input an encrypted index table, T.

At step 3050 the server update module takes as input mSet, wherein mSet is a bloomfilter.

In step 3060, the server update module extracts yc from m.

In step 3070, the server update module inserts e concatenated with yc into the table T.

In step 3080, the server update module extracts xtag from m.

In step 3090, the server update module inserts xtag into mSet.

At step 3100, the server update module determines whether the insertion of e concatenated with yc into T and the insertion of xtag into mSet were successful.

At step 3110, If one or both of the insertions fail, the server update module outputs that the update has failed.

At step 3120, the server update module reports a successful update if the insertion of e concatenated with yc into T and the insertion of xtag into mSet were successful.

The Server update module ends at 3130.

Figure 4A:
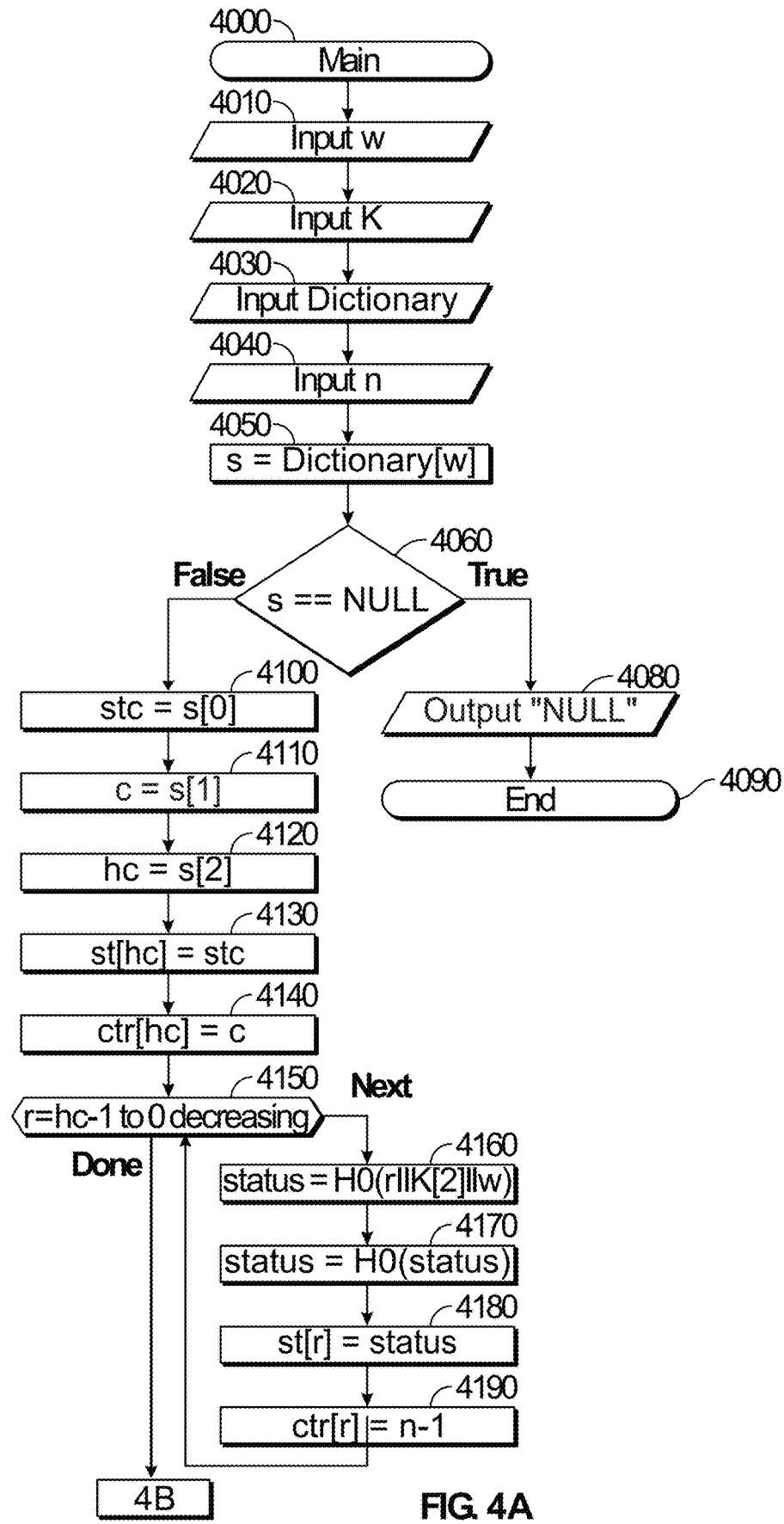
FIGS. 4A and 4B show an example algorithm for implementing the client single keyword search module.
Figure 4B:
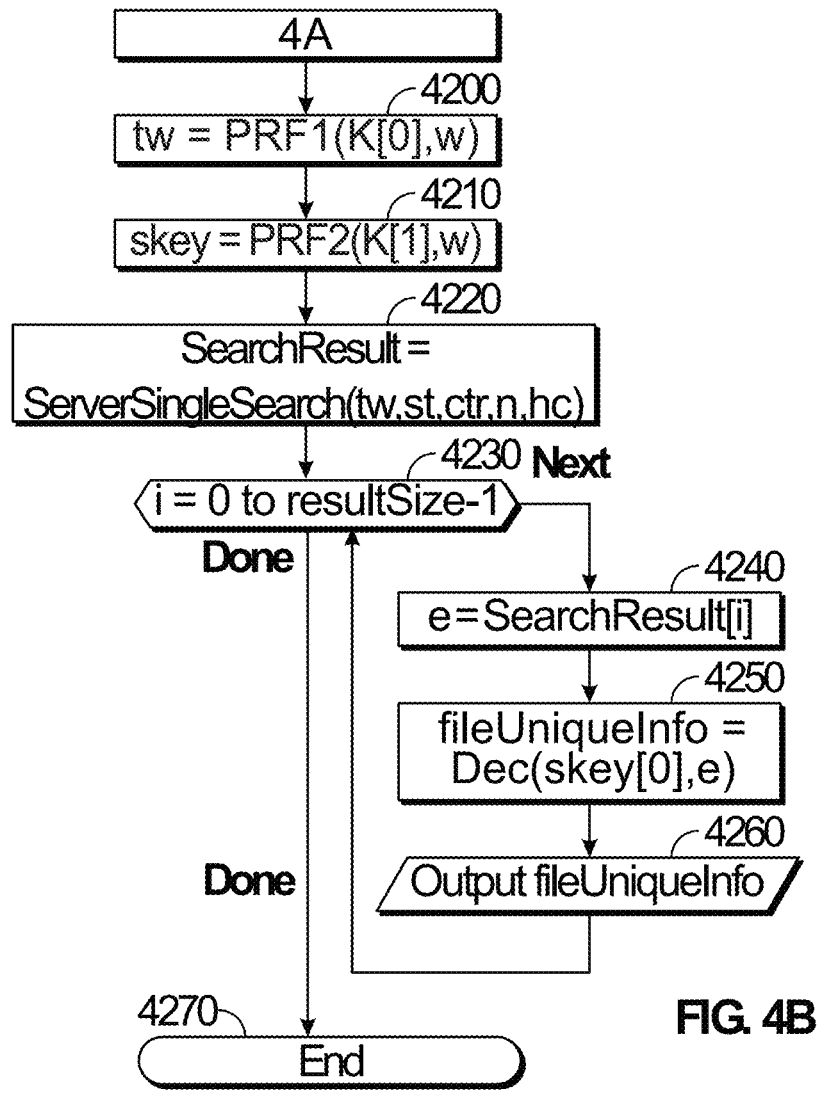

FIGS. 4A and 4B show an example client single keyword search module.

In FIG. 4A, the client single keyword search module starts at step 4000.

At step 4010, the client single keyword search module takes as input w.

At step 4020, the client single keyword search module takes as input K.

At step 4030, the client single keyword search module takes as input the dictionary.

At step 4040, the client single keyword search module takes as input n.

In step 4050, the client single keyword search module extracts a record, s, relating to the keyword, w, from the dictionary. $s=(st_c, c, h_c)$ At steps 4060 and 4070, if there is no record corresponding to w, i.e., s==NULL, then the client single keyword search module outputs NULL to indicate that there is no file including the keyword stored on the first cloud server and the client single search module ends at step 4090.

If at step 4060 there is a record corresponding to w:

At step 4100 the client single keyword search module extracts $st_c$, from the record.

At step 4110, the client single keyword search module extracts c from the record.

At step 4120, the client single keyword search module extracts $h_c$ from the record.

At steps 4130 to 4190, the client keyword single search module generates a list of counters and generates a list of $st_c$s (st) by:

setting the first entry in the list of $st_c s=st[h_c]=st_c$; wherein $st_c$ is taken from the record (step 4130);

setting the first entry in the list of counters=$ctr[h_c]=c$ (step 4140);

then, using the loop defined by step 4150, which iterated from $h_c-1$ to 0 decreasing:

setting the second entry in the list of counters=$ctr[h_c-1]=n-1$;

the third entry in the list of counters=$ctr[h_c-2]=n-1$; and so on until the final entry in the list of counters=$ctr[0]=n-1$; and setting the second entry in the list of $st_c s=st[h_c-1]=H0(h_c-1|k[2]|w)$; wherein k[2] is a third secret key and w is the keyword;

the third entry in the list of $st_c s=st[h_c-2]=H0(h_c-2|k[2]|w)$; and so on until the final entry in the list of $st_c s=st[0]=H0(0|k[2]|w)$;

The client single keyword search module continues in FIG. 4B.

At step 4200, the client single keyword search module generates a search token tw; wherein tw=PRF1(K[0],w) and PRF1 is a first pseudorandom function and K[0] is a first secret key.

At step 4210, the client single keyword search module defines skey=PRF2(K[1],w);

At step 4220, the client single keyword search module calls the server single keyword search module and sends to it the search token, $h_c$, n, the list of $st_c$s and the list of counters. The server single keyword search module will return encrypted versions of fileUinfo (e) for every file that contains the keyword w;

At steps 4230 to 4260, the client single keyword search module decrypts e for each returned result to extract and output fileUinfo.

The client single keyword search module ends at step 4270.

Figure 5:
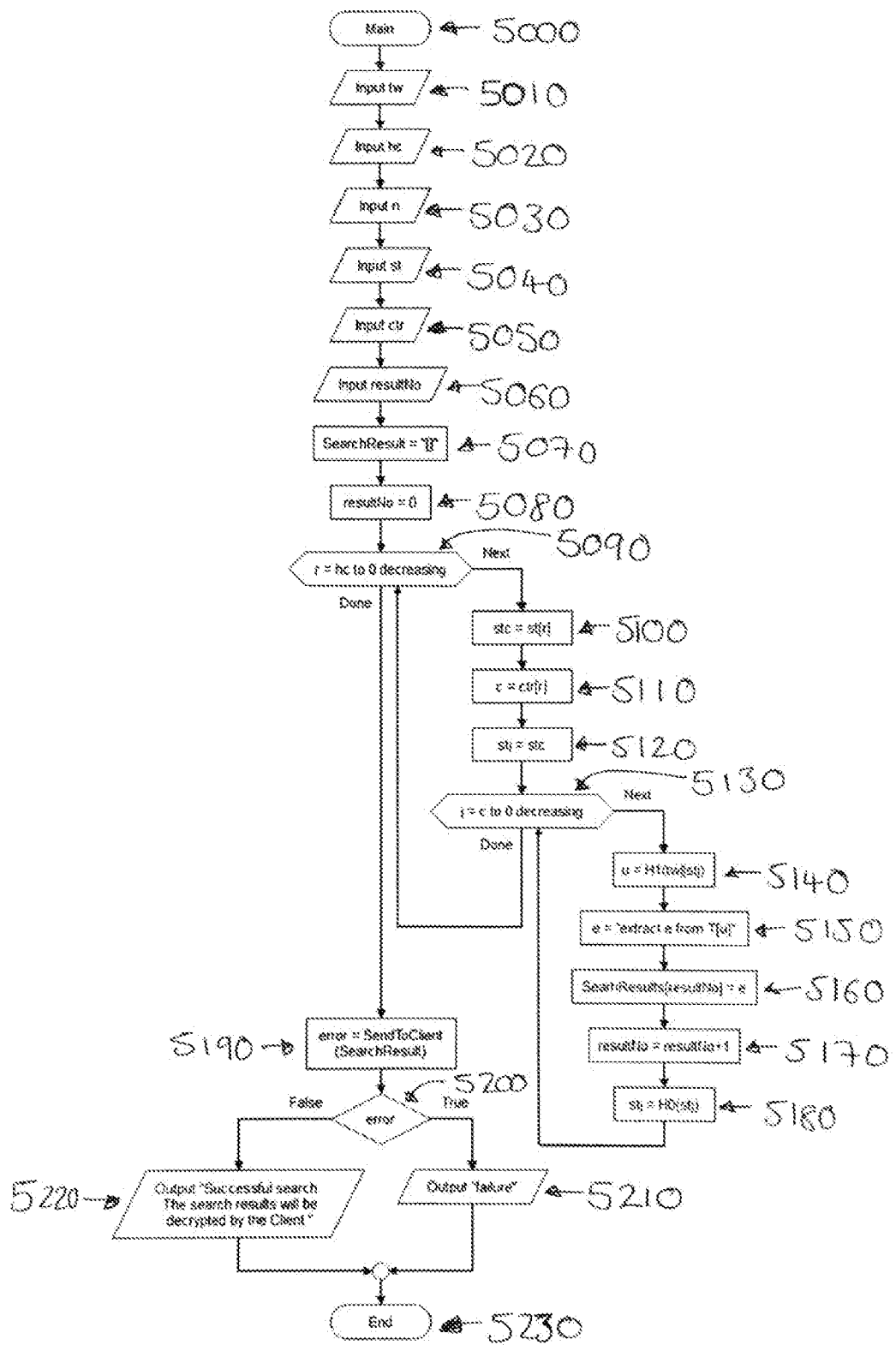
FIG. 5 shows an example algorithm for implementing the server single keyword search module.

FIG. 5 illustrates an example server single keyword search module according to the present invention.

The server single keyword search module starts at step 5000.

At step 5010 the server single search module takes as input tw, the search token generated by the client single keyword search module.

At step 5020, the server single keyword search module takes as input $h_c$.

At step 5030, the server single keyword search module takes as input n.

At step 5040, the server single keyword search module takes as input "st", wherein st is the list of $st_c$s.

At step 5050, the server single keyword search module takes as input the list of counters.

At step 5060, the server single keyword search module takes as input "resultNo" wherein resultNo is resultNo corresponds to the number of "es" that correspond to files that contain the keyword as resultNo is a counter that gets incremented whenever a file is retrieved by the Server. So, the final resultNo value should be equivalent to the number of files matching the search keyword.

At step 5070, the server single keyword search module initialises a list of search results "SearchResult".

At step 5080, the server single keyword search module initialises "resultNo" by setting it equal to zero.

At steps 5090 to 5180, the server single keyword search module computes all the unique secret values, u, associated with the keyword, w by:

from $r=h_c$ to r=0 decreasing in steps of 1 (step (5090):

extracting $st_c$ from the list of $st_c$s by setting $st_c=st[r]$ (step 5100);

extracting c from the list of counters by setting c=ctr[r] (step 5110);

setting stj equal to the extracted $st_c$ (step 5120);

still within the loop defined by step 5090, from j=c to j=0 decreasing in steps of 1 (step 5330) the server single keyword search module:

computes the unique secret value, $u=H1(tw|st_c)$ (step 5140);

extracts the encrypted database value, e, that corresponds to the unique secret value, u, from the table T (step 5150);

adds e to the list of search results (step 5160);

increases the results counter "resultNo" by 1 (step 5170);

sets stj=H0(stj) (step 5180); this step ensures that all the es that correspond to files containing the keyword are found when iterating through from c to 0 for each of $h_c$ to 0.

At step 5190, the server single keyword search module returns the list of search results to the client single keyword search module.

At step 5200, the server single keyword search module determines whether the list of search results has been successfully sent to the client.

At step 5210, the server single keyword search module outputs "failure" if the list of search results has not been successfully sent to the client.

At step 5220, the server single keyword search module outputs that the search was successful if the list of search results has been successfully sent to the client.

The server single keyword search module ends at step 5230.

Figure 6A:
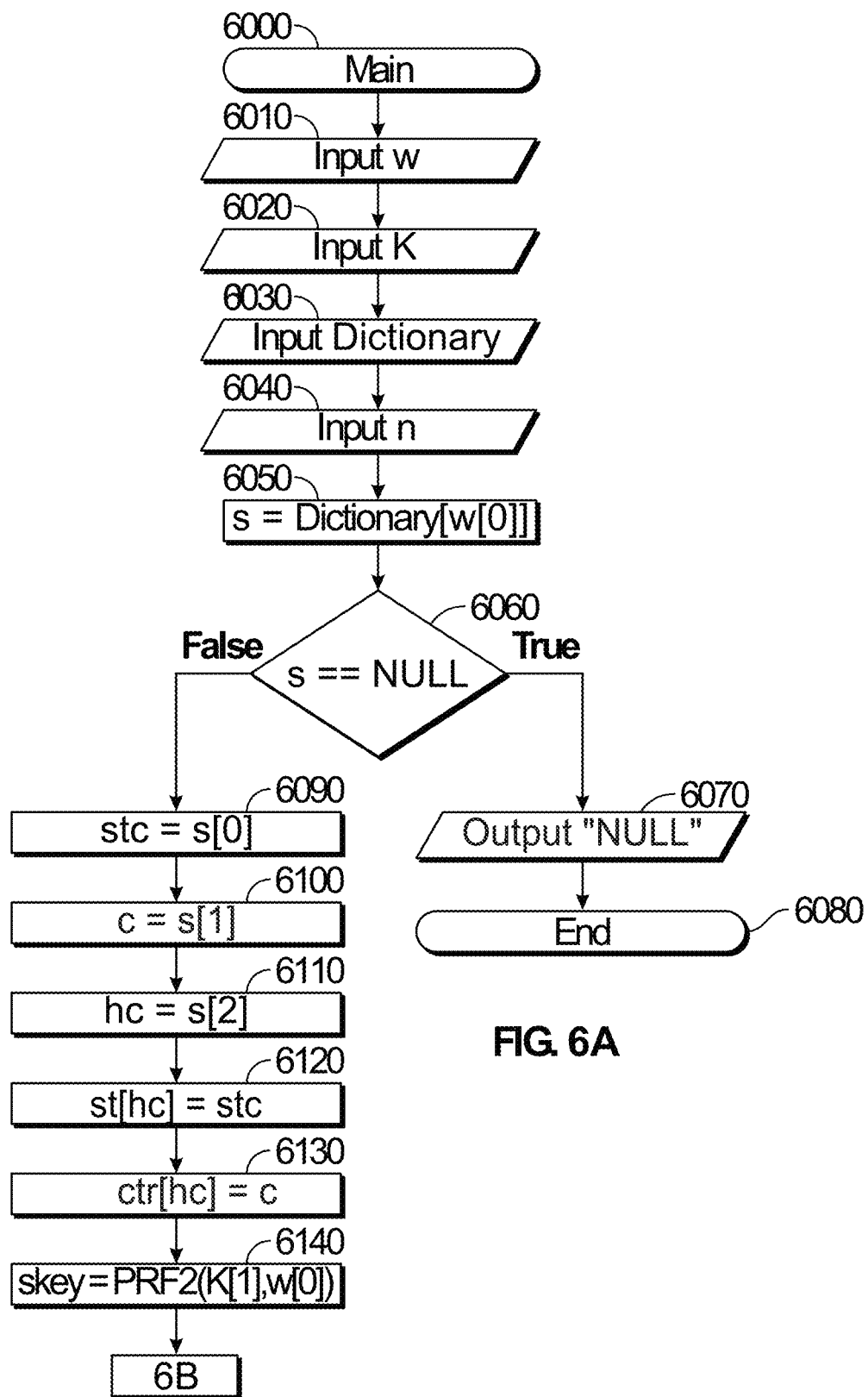
FIGS. 6A and 6B show an example algorithm for implementing the client multi keyword search module.
Figure 6B:
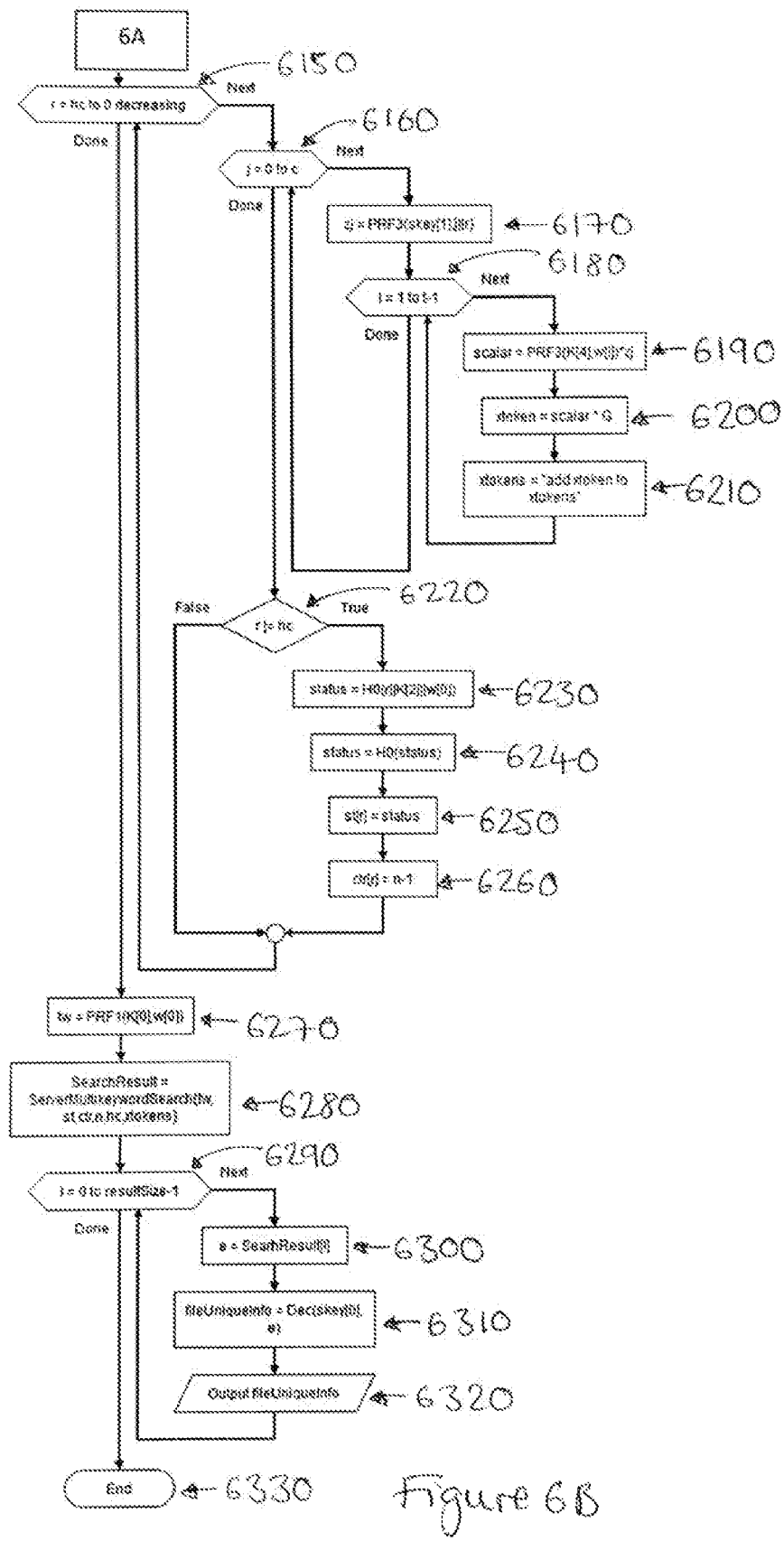

FIGS. 6A and 6B illustrates an example client multi keyword search module according to the present invention.

In FIG. 6A, the client multi keyword search module begins at step 6000.

At step 6010, the client multi keyword search module takes as input w, in the multi keyword searching modules (client and server), w is an array containing one or more keywords to be searched.

At step 6020, the client multi keyword search module takes as input K.

At step 6030, the client multi keyword search module takes as input the dictionary, At step 6040 the client multi keyword search module takes as input n.

In step 6050, the client single keyword search module extracts a record, s, relating to the first keyword in w, w[0], from the dictionary, wherein s=(st$_c$,c, h$_c$).

At step 6060 the client multi keyword search module determines if there is a record corresponding to w[0] in the dictionary.

At step 6070, if there is no record corresponding to w[0], i.e., s==NULL, then the client multi keyword search module outputs NULL to indicate that there is no file including the first keyword stored on the first cloud server. The client multi keyword search module then ends at step 6080.

If at step 6060 there was a record corresponding to w[0], then:

At step 6090 the client multi keyword search module extracts st$_c$, from the record.

At step 6100, the client multi keyword search module extracts c from the record.

At step 6110, the client multi keyword search module extracts h$_c$ from the record.

At step 6120, the client multi keyword search module sets st[h$_c$]=st$_c$ to initialise st, wherein st is the list of st$_c$s.

At step 6130, the client multi keyword search module sets ctr[h$_c$]=c to initialise ctr, wherein ctr is the list of counters.

At step 6140, the client multi keyword search module defines skey=PRF2(K[1],w);

The client multi keyword search module continues on FIG. 6B.

In a loop running between steps 6150 to 6260 from r=h$_c$ to r=0 decreasing:

the client multi keyword search module generates xtokens by:

at step 6160, defining a loop from j=0 to j=c:
setting zj=PRF3(skey[1],j∥r) at step 6170;
then at steps 6180 to 6210 in a loop from i=1 to i=t-1, wherein t is the number of keywords w:
generating a scalar equal to PRF3(K[4],w[i]*zj) (step 6190);
computing an xtoken by multiplying the scalar by G (step 6200), wherein G is the base point of an elliptic curve group. An xtoken is therefore an elliptic curve point. 'j' is a counter ranging from 0 to 'c' where 'c' is the counter corresponding to the first keyword w[0] and 'i' is the counter corresponding to the other keyword terms in multi-keyword query 'w[1]', ... 'w[t-1]'. Further details on the xtokens can be found in D. Cash, S. Jarecki, C. Jutla, H. Krawczyk, M.-C. Roşu and M. Steiner, "Highly-scalable searchable symmetric encryption with support for boolean queries.," in *Crypto*, 2013;

the computed xtoken is then added to "xtokens" at step 6210. "xtokens" is a list of computed xtokens.

After generating the list of xtokens from j=0 to j=c and remaining in the loop defined by step 6150, the client multi keyword search module determines at step 6220 whether r is not equal to h$_c$. If r is equal to h$_c$, the method returns to step 6150 to continue the loop. If r is not equal to h$_c$:

at step 6230, the client multi keyword search module sets a status equal to H0(r∣ K[2]∥w[0]);

at step 6240, the client multi keyword search module sets the status equal to H0(status);

at step 6250, the client multi keyword search module sets the r$^{th}$ value in the list of st$_c$s, st[r], to be equal to the status;

at step 6260, the client multi keyword search module sets the r$^{th}$ value in the list of counters, ctr[r], to be equal to n-1. The client multi keyword search module then returns to step 6150. Steps 6230 to 6260 generate a list of counters and a list of st$_c$s as the method works through the loop defined by step 6150.

After finishing the loop defined by step 6150, At step 6270, the client multi keyword search module generates a search token tw; wherein tw=PRF1(K[0],w) and PRF1 is a first pseudorandom function and K[0] is a first secret key.

At step 6280, the client multi keyword search module calls the server multi keyword search module and sends to it the search token, h$_c$, n the list of st$_c$s and the list of counters and the list of xtokens. The server multi keyword search module will return encrypted versions of fileUinfo (e) for every file that contains all the keywords in w;

At steps 6290 defines a loop that runs from i=0 to i=(resultSize-1) wherein resultSize is the size of the results list, SearchResult, returned by the server multi keyword search module.

Within the loop defined by step 6290, at steps 6300 to 6320, the client multi keyword search module:

Extracts the i$^{th}$ result (e) from the result list at step 6300;
decrypts e to extract fileUinfo (fileUinfo is equivalent to fileUniqueinfo) at step 6310;
outputs FileUinfo at step 6320 before returning to the loop defined by step 6290;

Upon completing the loop defined by step 6290, the client multi keyword search module ends at step 6330.

Figure 7A:
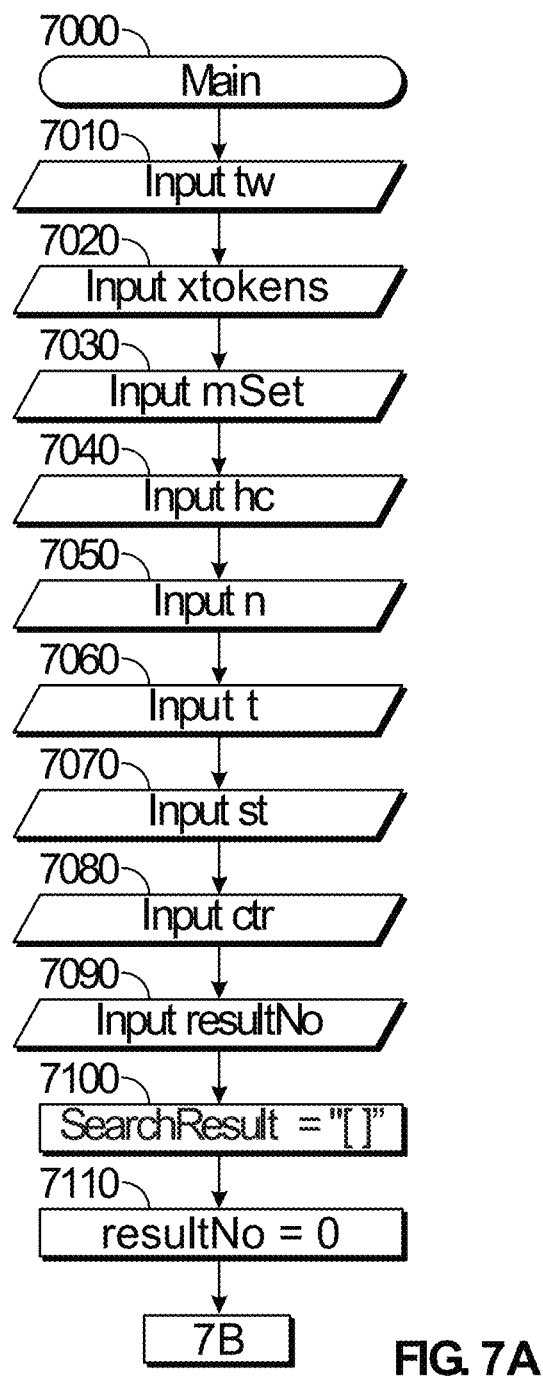
FIGS. 7A and 7B show an example algorithm for implementing the server multi keyword search module.
Figure 7B:
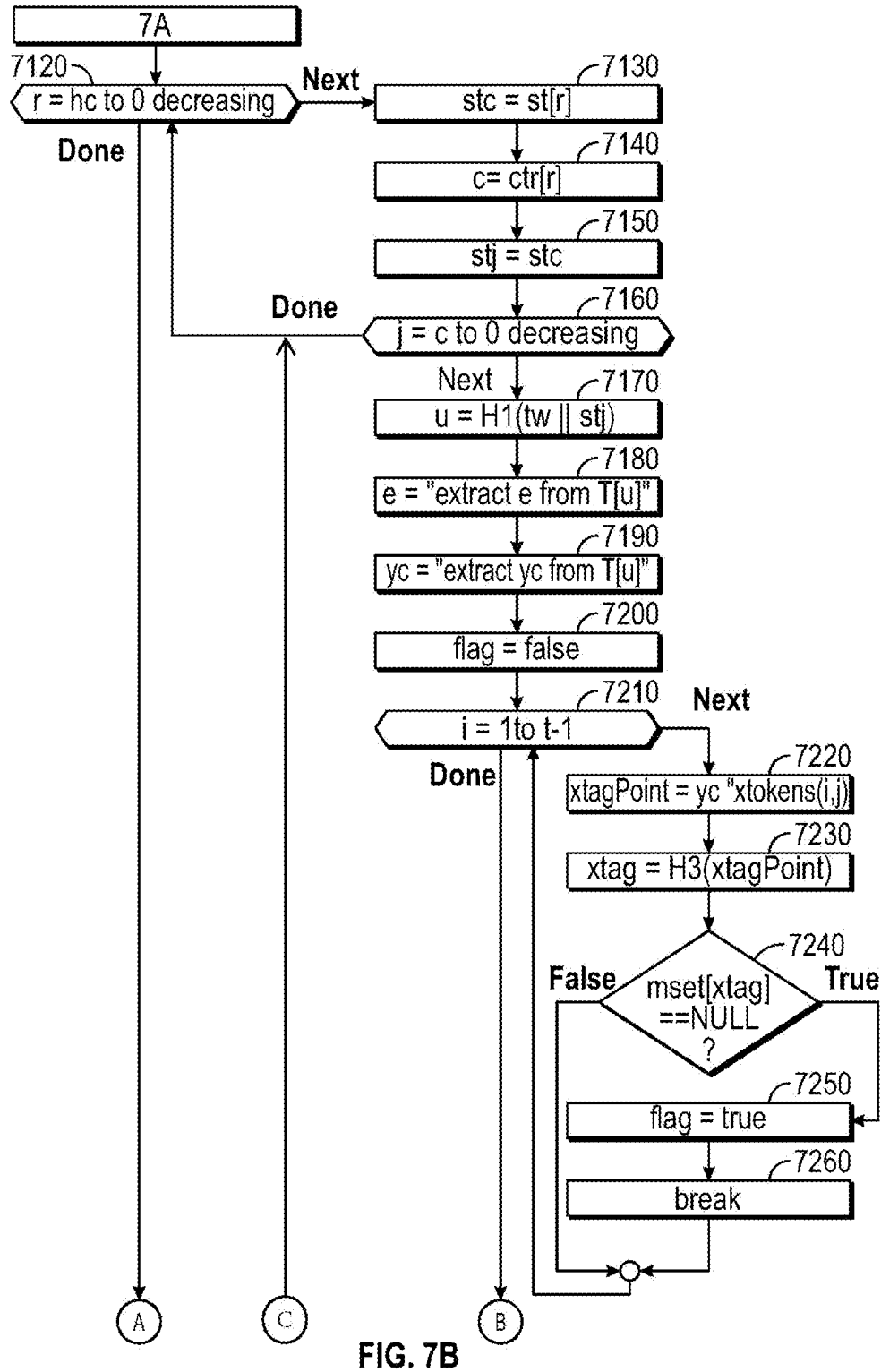
Figure 7B:
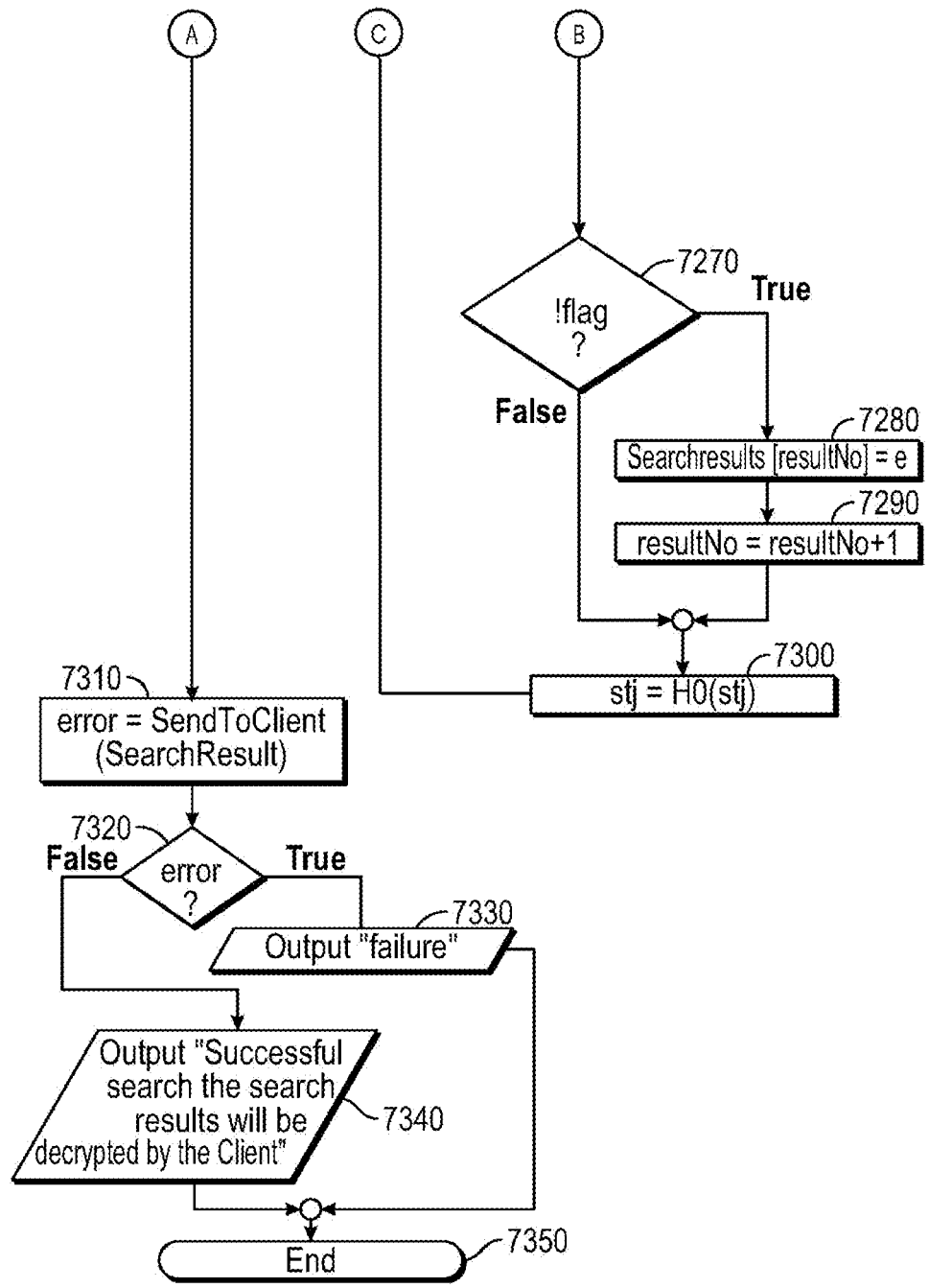

FIGS. 7A and 7B illustrate an example server multi keyword search module according to the present invention.

In FIG. 7A, the server multi keyword search module begins at step 7000;

At step 7010 the server multi keyword search module takes as input tw, the search token generated by the client multi keyword search module.

At step 7020 the server multi keyword search module takes as input "xtokens", the list of xtokens generated by the client multi keyword search module.

At step 7030 the server multi keyword search module takes as input mSet, wherein mSet is a bloomfilter.

At step 7040, the server multi keyword search module takes as input h$_c$.

At step 7050, the server multi keyword search module takes as input n.

At step 7060, the server multi keyword search module takes as input t, wherein t is the number of keywords in w.

In the multi keyword searching modules (client and server), w is an array containing one or more keywords to be searched.

At step 7070, the server multi keyword search module takes as input "st", wherein st is the list of $st_c$s generated by the client multi keyword search module.

At step 7080, the server multi keyword search module takes as input "ctr" wherein ctr is the list of counters generated by the client multi keyword search module.

At step 7090, the server multi keyword search module takes as input "resultNo" wherein resultNo is a result counter that corresponds to the number of "es" that correspond to files that contain the all of the keywords in w. resultNo is a counter that gets incremented whenever a file is retrieved by the Server. So, the final resultNo value should be equivalent to the number of files matching the search keyword.

At step 7100, the server multi keyword search module initialises a list of search results "SearchResult".

At step 7110, the server multi keyword search module initialises "resultNo" by setting it equal to zero.

The server multi keyword search module continues in FIG. 7B.

At steps 7120 to 7300, the server multi keyword search module computes all the unique secret values, u, and associated encrypted database values, e, associated with files that contain all the keywords in w by:

Defining a loop from $r=h_c$ to $r=0$ decreasing in steps of 1 (step (7120) and within that loop:
  extracting $st_c$ from the list of $st_c$s by setting $st_c$=st[r] (step 7130);
  extracting c from the list of counters by setting c=ctr[r] (step 7140);
  setting stj equal to the extracted $st_c$ (step 7150);
    still within the loop defined by step 7120, creating a new loop from j=c to j=0 decreasing in steps of 1 (step 7160) and within that loop:
    computing the unique secret value, u=H1(twIstc) (step 7170);
    extracting the encrypted database value, e, that corresponds to unique secret value, u, from the table T (step 7180);
    extracting the yc, that corresponds to the encrypted database value, u, from the table T (step 7190);
    initialising a flag as false (step 7200)
    still within the loop defined by step 7160, creating a new loop from i=1 to i=t−1 increasing in steps of 1 (step 7210) and within that loop:
    computing xtag at step 7220 and 7230 by setting xtagPoint=yc*xtokens[i,j]; (step 7220) and then setting xtag=H3(xtagPoint) wherein H3 is a Hash function; and then searching for xtag in mSet at step 7240.
    If at step 7240 xtag is not found in mSet, i.e., mSet[xtag]==NULL is true, at step 7250 the server multi keyword search module sets the flag to true and executes a break at step 7260 to exit the loop defined by step 7210.
    Following either the break (step 7260) or the completion of the loop defined by step 7210, at step 7270 the server multi keyword search module determines whether there is a flag is true. If the flag is false (!flag is true) then e that was extracted at step 7180 is added to the list of search results (step 7250) and the results counter is increased by 1 at step 7290 by setting resultNo=resultNo+1; the method then continues to step 7300 where stj is set to H0stj before returning to step 7160. Step 7300 ensures that all the es that correspond to files containing all of the keywords in w are found when iterating through from c to 0 for each of $h_c$ to 0. If at step 7270 the flag is true then the method continues to step 7300 directly without registering a new result.

After completing the loop defined by step 7120, at step 7310, the server multi keyword search module returns the list of search results to the client multi keyword search module.

At step 7320, the server multi keyword search module determines whether the list of search results has been successfully sent to the client.

At step 7330, the server multi keyword search module outputs "failure" if the list of search results has not been successfully sent to the client.

At step 7340, the server multi keyword search module outputs that the search was successful if the list of search results has been successfully sent to the client.

The server multi keyword search module ends at step 7350.

The invention claimed is:

1. A method for providing a dynamic searchable symmetric encryption scheme having forward privacy the method comprising:
  by a client device:
    creating an unencrypted file;
    creating a list of keywords present in the unencrypted file;
    encrypting the unencrypted file and uploading it to a first cloud server;
    providing a hash chain length, n;
    providing an array, K, wherein K contains a plurality of secret keys; and
    providing a local database, stored at the client device, wherein the local database is a key-value store, wherein the key represents a keyword and the value represents a record as a tuple, ($st_c$, c, $h_c$), where c is a counter representing a number of updates of the keyword, $h_c$ is a hash chain counter incremented by one every time n updates of the keyword are completed, and $st_c$ represents a hash chain value of a hash chain number $h_c+1$;
  by a client update module of the client device:
    for each keyword on the list of keywords:
      computing a unique secret value, u; wherein u relates to a specific instance of an update operation of a specific keyword;
      computing an encrypted database value; wherein the encrypted database value contains information about the unencrypted file, the information including at least a file identifier; and
      generating an object, fileUInfo, which contains the file identifier, a file name, a number of occurrences of the keyword and a timestamp, wherein the file identifier provides a location of the unencrypted file on the first cloud server;
    wherein computing the unique secret value comprises:
      searching for, in the local database, the record that corresponds to the keyword;
      if there is no record that corresponds to the keyword,
        setting $h_c$=0;
        setting $h_c=h_c+1$;
        c=−1;

or, if there is the record corresponding to the keyword, then c is set to a value of c in the record and $h_c$ is set to a value of $h_c$ in the record,
if c=n−1, the client update module sets $h_c=h_c+1$ and c=−1; and
following setting the values $h_c$ and c, the method further comprises, by the client update module:
setting a status, wherein the status is equal to ($h_c$|K[2]|w) wherein K[2] is a third secret key in K;
constructing a hash chain;
updating the local database by setting c=c+1; and setting $st_c$=equal to an (n−c)$^{th}$ entry in the hash chain; and
computing u from $st_c$ by:
generating a search token, tw; wherein tw=PRF1(K[0],w); wherein PRF1 is a first pseudorandom function, K[0] is a first secret key in K, and w is the keyword; and
setting u=H1(tw|$st_c$); wherein H1 is a hash function;
wherein computing the encrypted database value comprises:
encrypting fileUinfo; wherein an encrypted version of fileUinfo is known as e; and
setting the encrypted database value to equal e; and
calling a server update module of a second cloud server; wherein the second cloud server stores an encrypted table, T, wherein T has a first column and a second column;
wherein the server update module inserts the unique secret value into the first column of T, and inserts the encrypted database value into the second column of T.

2. The method of claim 1, wherein creating the list of keywords present in the unencrypted file comprises:
identifying all individual words in the unencrypted file,
for each identified word in the unencrypted file:
determining if the identified word is a keyword;
if the identified word is a keyword, adding the identified word to a list of keywords.

3. The method of claim 1, wherein constructing the hash chain comprises: iterating a hash function, H0, over the status n times such that:
a first entry in the hash chain=HashChain[0]=H0(status),
a second entry in the hash chain=HashChain[1]=H02(status),
a third entry in the hash chain=HashChain[2]=H03(status), and so on until
an nth entry in the hash chain=HashChain[n−1]=H0n(status).

4. The method of claim 1, wherein the unencrypted file is a text file.

5. The method of claim 1, wherein the unencrypted file is an audio file;
wherein identifying within the unencrypted file, one or more keywords comprises:
converting the audio file to a text file;
identifying one or more keywords from the text file;
wherein the method further comprises:
encrypting the text file; and
uploading the text file to the first cloud server.

6. The method of claim 1 wherein the client device is a voice assistant device.

7. A method for performing a single keyword search of an encrypted index table as updated using the method of claim 1, the method comprising:
by the client device:
receiving a user inputted keyword;
by a client single keyword search module of the client device:
searching, in the local database, for a keyword that matches the user inputted keyword;
if the keyword that matches the user inputted keyword is found in the local database, obtaining, from the local database, the record associated with the user inputted keyword;
deriving information from the record;
sending the information derived from the record to a server single keyword search module;
by the server single keyword search module:
using the information derived from the record to compute all the unique secret values associated with the keyword;
for each unique secret value associated with the keyword, adding the corresponding encrypted database value to a result list:
returning the result list to the client single keyword search module of the client device;
by the client single keyword search module of the client device:
decrypting the encrypted database values;
extracting file identifiers from the decrypted database values;
by the client device:
using the file identifiers to locate files containing the keyword on the first server.

8. The method of claim 7 wherein deriving information from the record comprises:
generating the list of counters; wherein generating a list of counters comprises:
setting a first entry in the list of counters as ctr[$h_c$]=c; wherein c is taken from the record;
setting a second entry in the list of counters as ctr[$h_c$−1]=n−1;
a third entry in the list of counters as ctr[$h_c$−2]=n−1; and so on until
a final entry in the list of counters as ctr[0]=n−1;
generating a list of $st_c$s; wherein generating the list of $st_c$s comprises:
setting the first entry in the list of $st_c$s as st[$h_c$]=$st_c$; wherein $st_c$ is taken from the record;
setting the second entry in the list of $st_c$s as st[$h_c$−1]=H0($h_c$−1|k[2]|w); wherein k[2] is a third secret key and w is the keyword;
the third entry in the list of $st_c$s as st[$h_c$−2]=H0($h_c$−2|k[2]|w); and so on until
the final entry in the list of $st_c$s as st[0]=H0(0|k[2]|w);
generating a search token tw; wherein tw=PRF1(K[0],w) and PRF1 is a first pseudorandom function and K[0] is a first secret key and w is the keyword;
wherein the information derived from the record comprises the list of counters, the list of $st_c$s and the search token.

9. The method of claim 8 wherein using the information derived from the record to compute all the unique secret values associated with the keyword comprises:
for $h_i=h_c$ to $h_i=0$ decreasing in steps of 1:
for c=ctr[$h_c$] to c=0 decreasing in steps of 1:
computing the unique secret value as $H_1$(tw|$st_c$);
wherein $st_c$=H0$^{n-c}$(hc|k[2]|w).

10. The method of claim 7, wherein the client device is a voice assistant device and the user inputted keyword is received in a form of spoken audio; wherein the client device uses automatic speech recognition to convert the user inputted keyword to text.

* * * * *